Jan. 24, 1933.  B. A. PROCTOR  1,894,963
PHOTOGRAPHIC APPARATUS
Filed Sept. 8, 1925  11 Sheets-Sheet 1

INVENTOR
Barton A. Proctor
by his attorneys
Byrnes, Stebbins & Parmelee

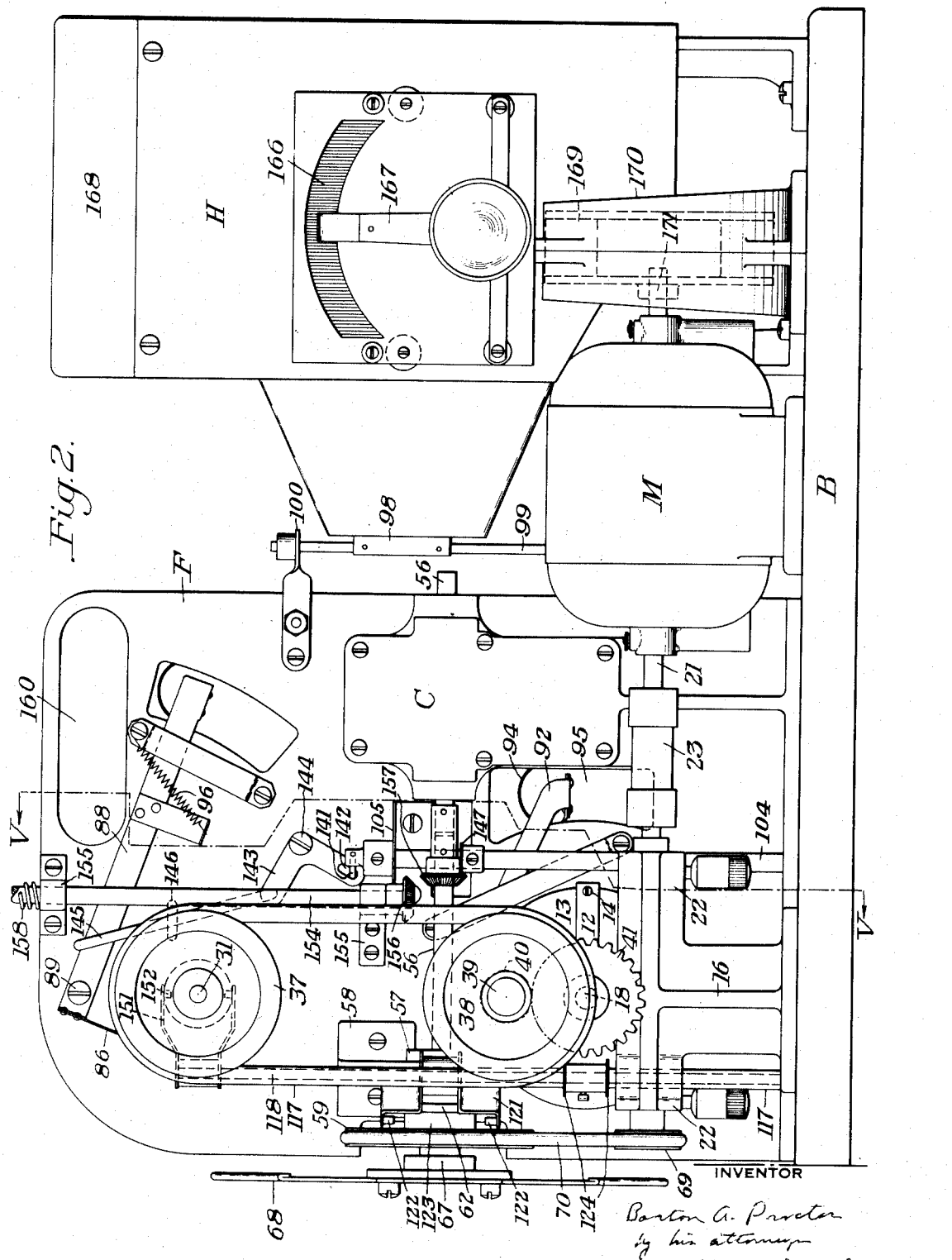

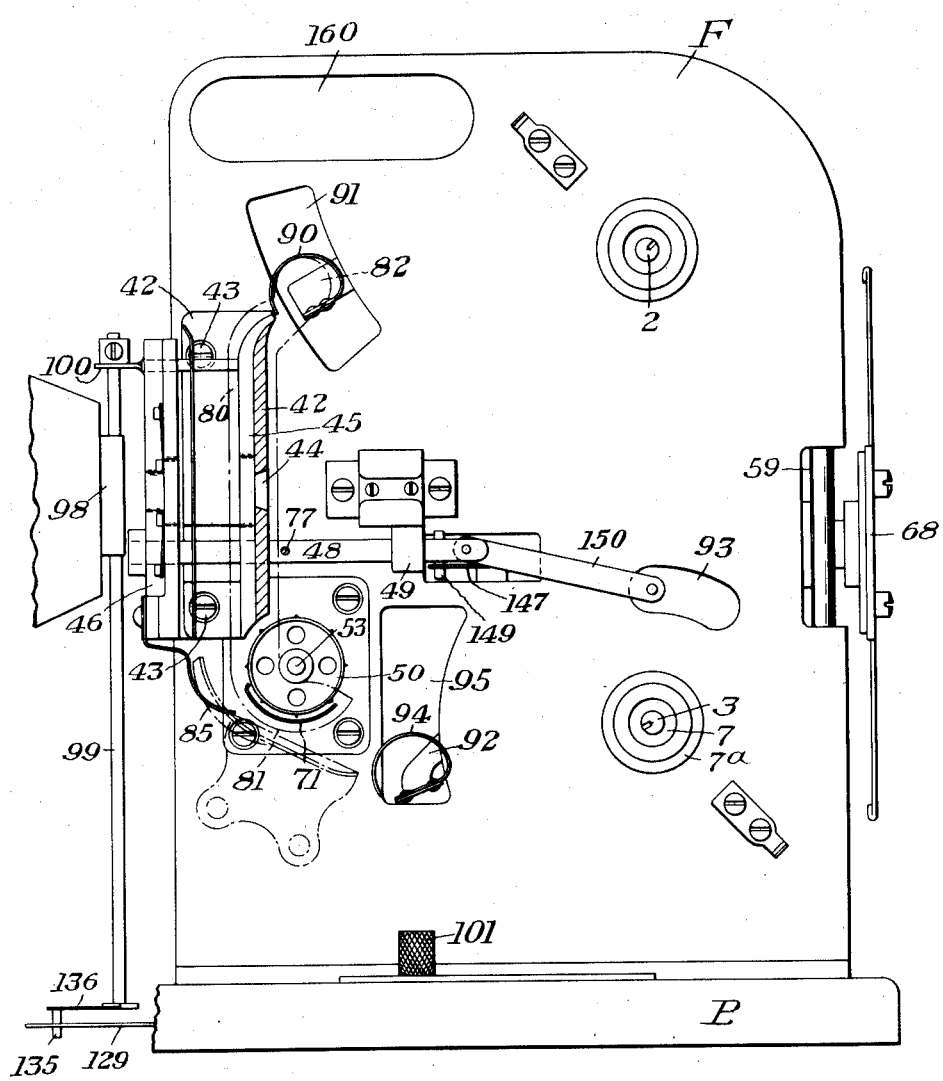
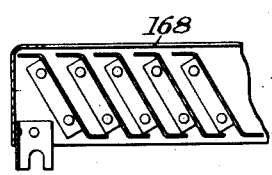

Jan. 24, 1933.  B. A. PROCTOR  1,894,963
PHOTOGRAPHIC APPARATUS
Filed Sept. 8, 1925  11 Sheets-Sheet 4
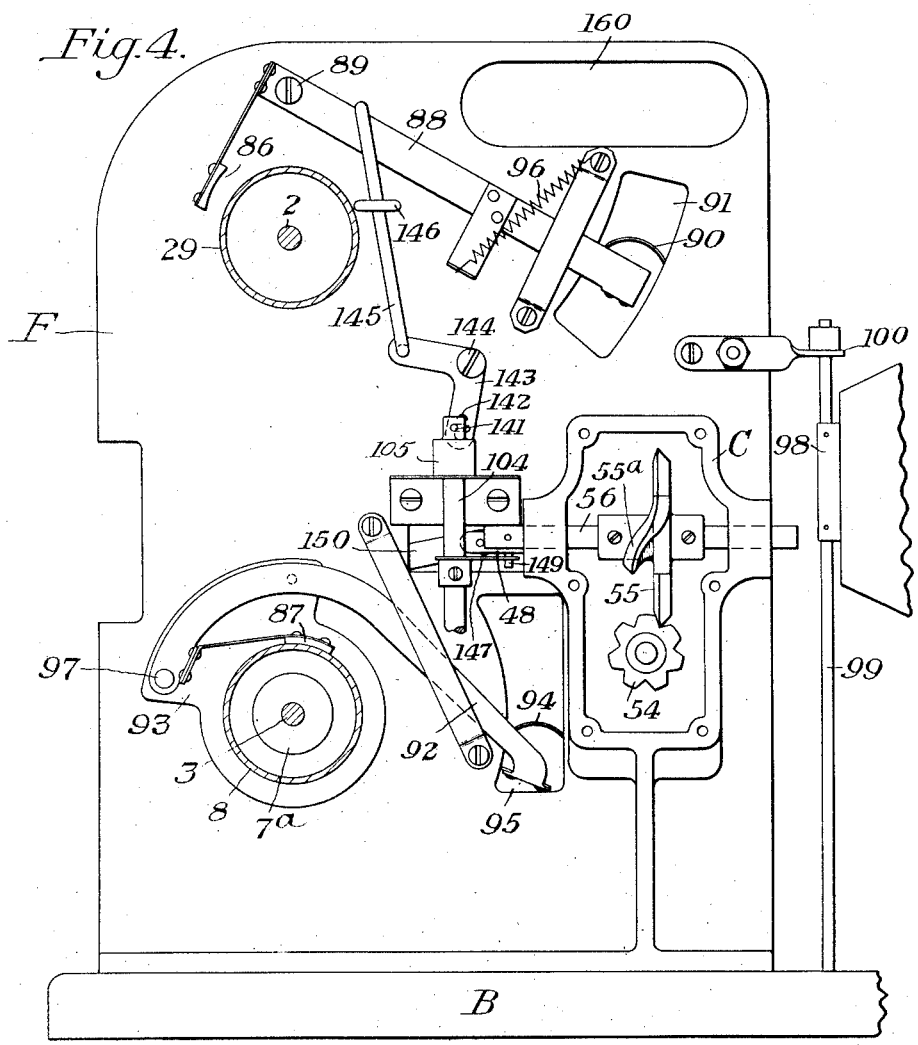
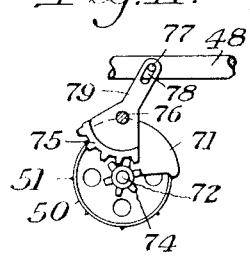 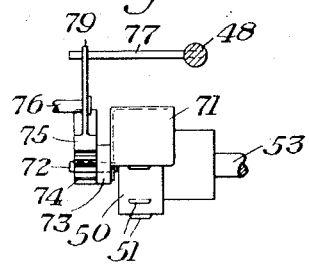
INVENTOR Jan. 24, 1933.  B. A. PROCTOR  1,894,963
PHOTOGRAPHIC APPARATUS
Filed Sept. 8, 1925  11 Sheets-Sheet 5

INVENTOR
Barton A. Proctor
by his attorneys
Byrnes, Stebbins & Parmelee

Jan. 24, 1933.   B. A. PROCTOR   1,894,963
PHOTOGRAPHIC APPARATUS
Filed Sept. 8, 1925   11 Sheets-Sheet 6

INVENTOR

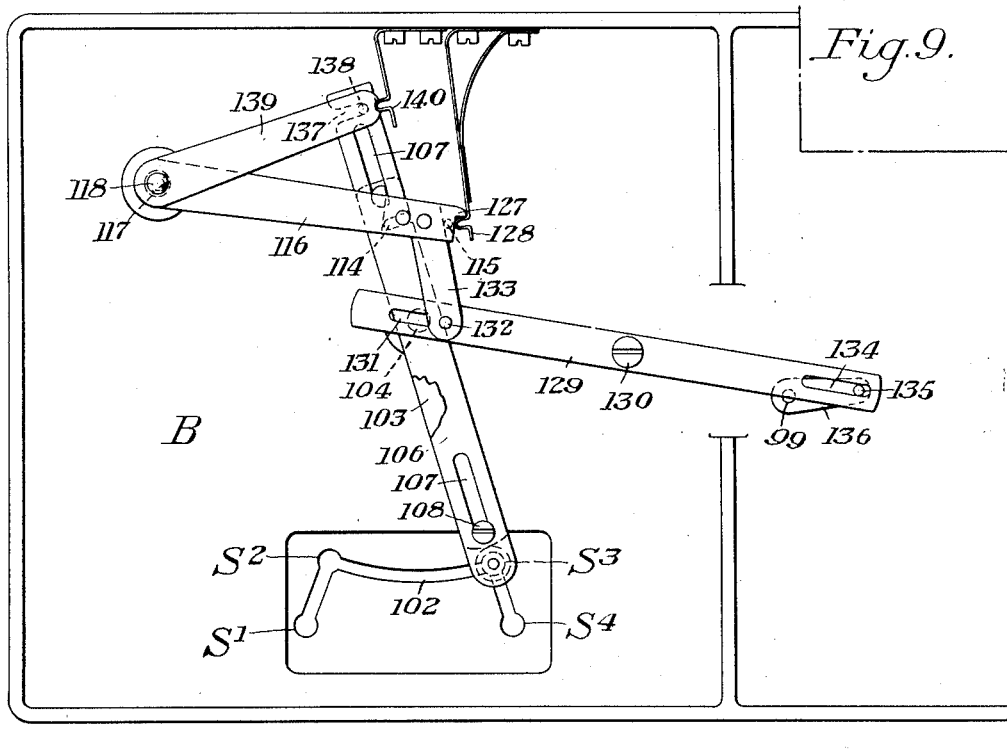
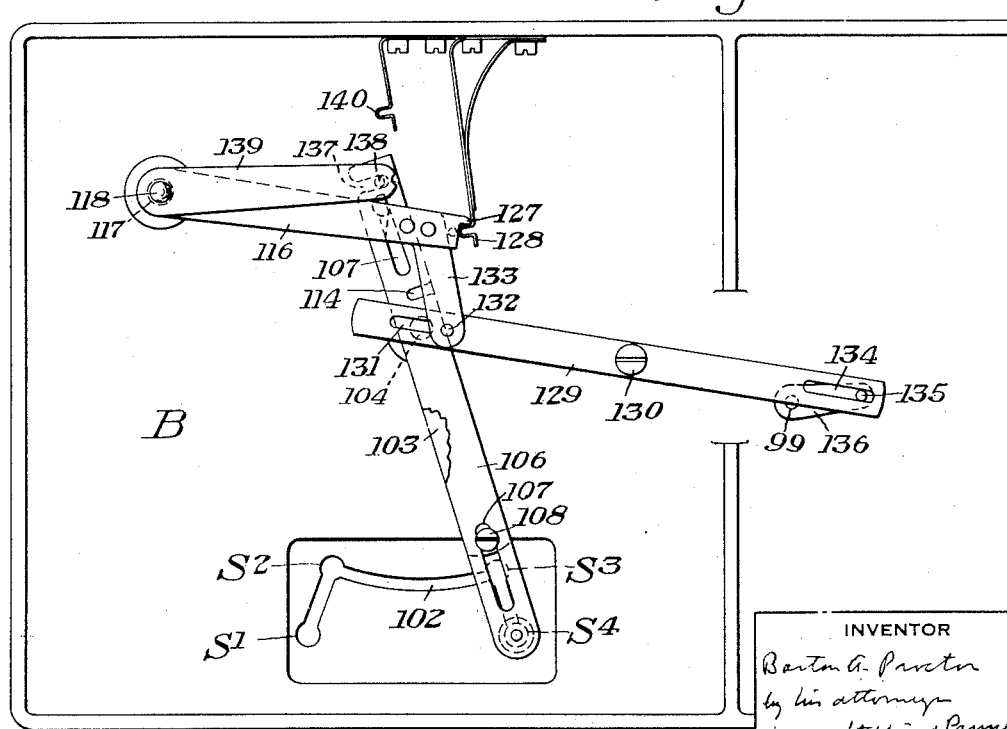

Jan. 24, 1933.  B. A. PROCTOR  1,894,963
PHOTOGRAPHIC APPARATUS
Filed Sept. 8, 1925  11 Sheets-Sheet 8

INVENTOR

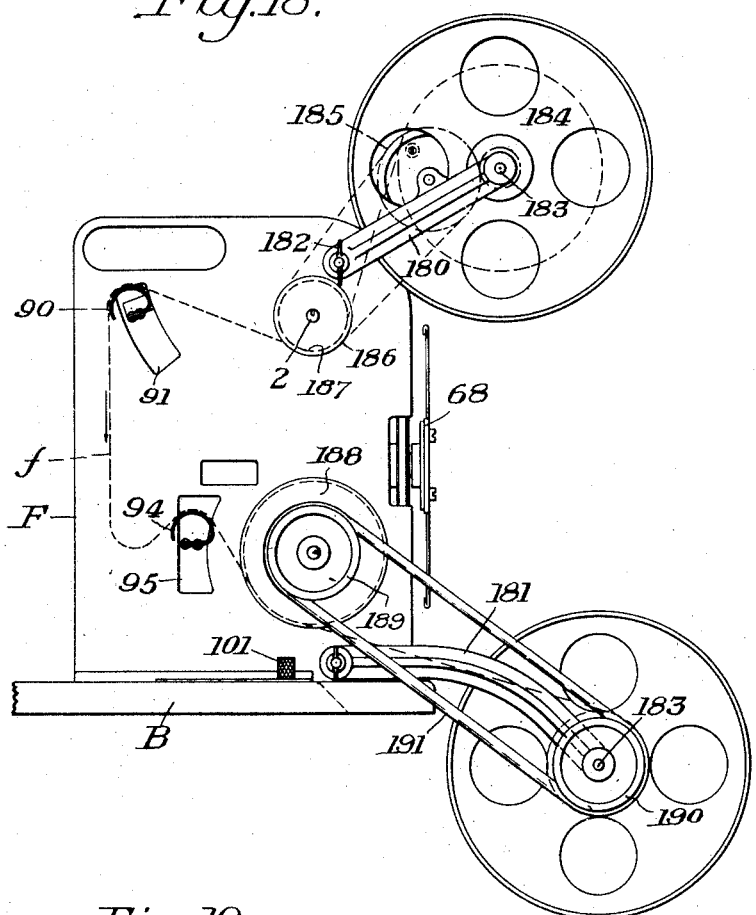
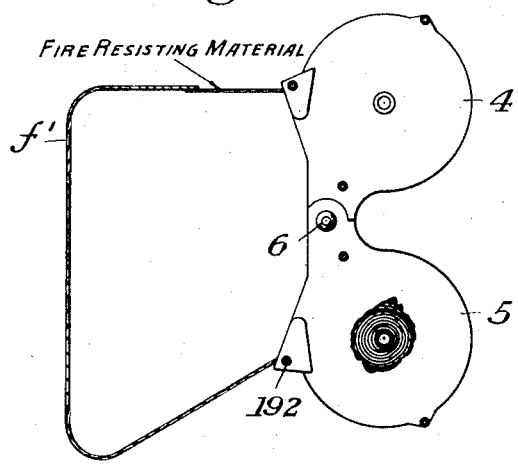

Jan. 24, 1933.                B. A. PROCTOR                1,894,963
                           PHOTOGRAPHIC APPARATUS
                       Filed Sept. 8, 1925      11 Sheets-Sheet 10
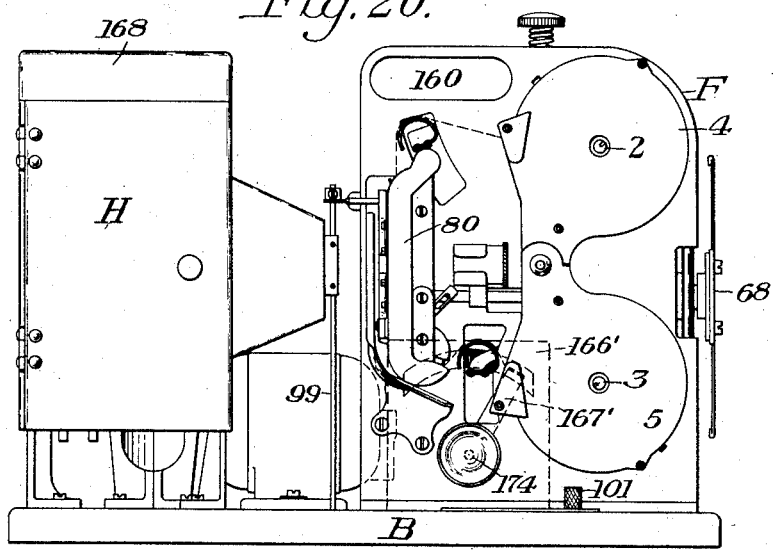
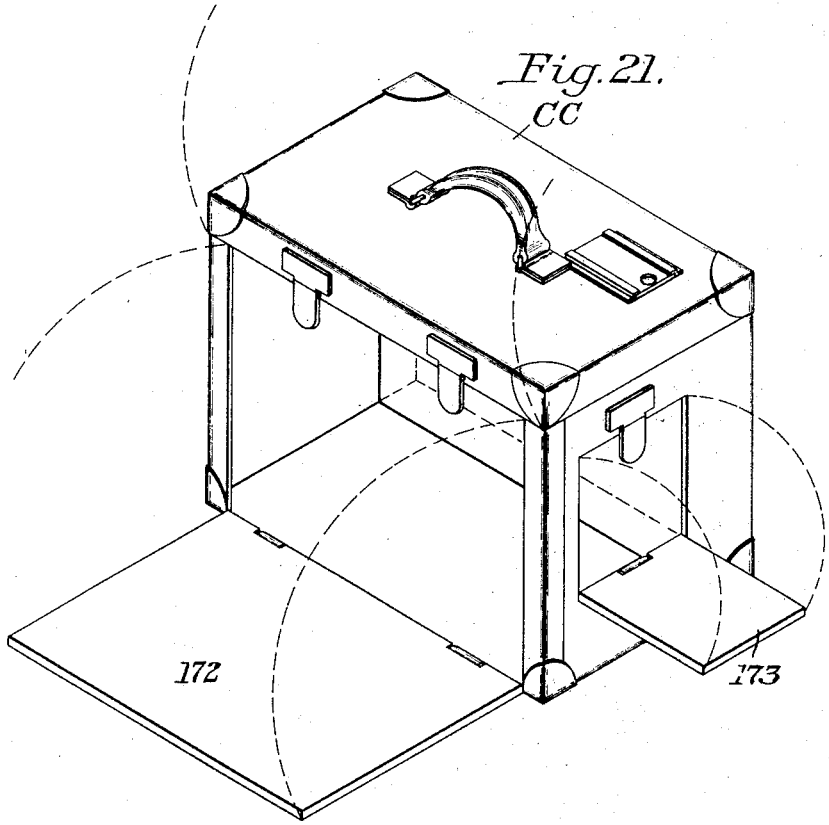
INVENTOR Jan. 24, 1933.  B. A. PROCTOR  1,894,963
PHOTOGRAPHIC APPARATUS
Filed Sept. 8, 1925   11 Sheets-Sheet 11
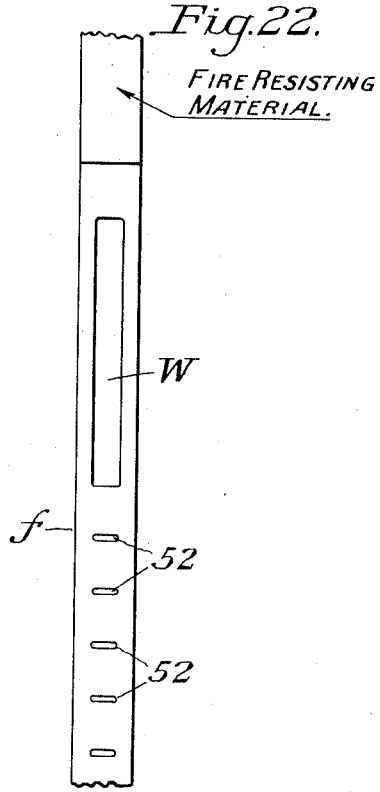
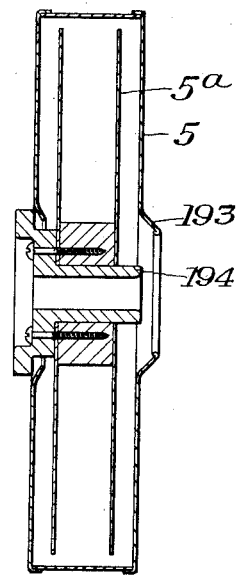
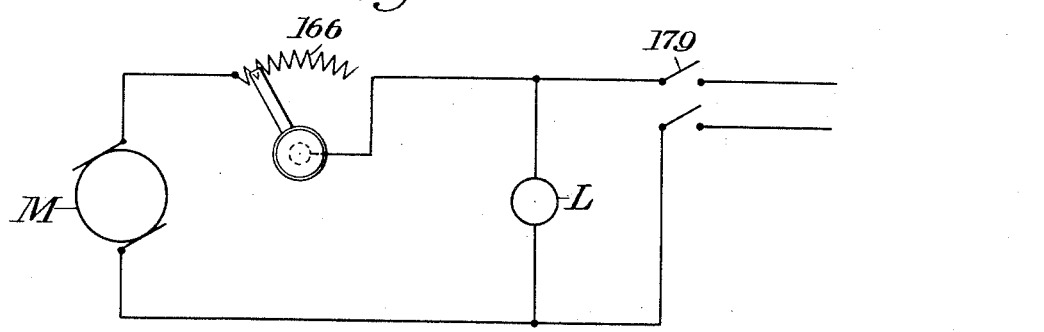
INVENTOR Patented Jan. 24, 1933

1,894,963

UNITED STATES PATENT OFFICE

BARTON A. PROCTOR, OF NEW YORK, N. Y., ASSIGNOR, BY MESNE ASSIGNMENTS, TO KINATOME PATENTS CORPORATION, OF NEW YORK, N. Y., A CORPORATION OF NEW YORK

PHOTOGRAPHIC APPARATUS

Application filed September 8, 1925. Serial No. 54,910.

The present invention relates broadly to the art of photography, and more particularly to improvements in apparatus adapted for the taking and projection of pictures either as so called still or motion pictures.

Heretofore in the art to which the invention relates it has been customary to thread films into position by hand, this operation being extremely difficult not only by reason of the sensitiveness of the films being handled and the different parts through or around which they have had to be threaded, but also because of the operating conditions usually obtaining where such apparatus is used. The present invention has for one of its objects the provision of an improved apparatus by means of which the threading operation is greatly expedited, and if desired, performed entirely without the necessity of the operator actually touching the film.

The threading operation has also usually involved the manual formation of the loops or slack heretofore required in the successful feeding of the films. In accordance with the present invention for the slack loops of unsupported film which characterize previous projectors, I substitute a condition of continuous controlled tension upon the film which I automatically create prior to the starting of operation of the apparatus and automatically maintain in proper degree throughout the operation of the apparatus. In my apparatus I eliminate the continuously rotating feeding and taking up sprockets which characterize the apparatus of others and substitute therefor this automatic feed controlling mechanism which can be operated simply and at will in timed relationship to the operation of all the other functions of the mechanism. I therefore eliminate the possibility of mistake in the original formation of a loop, the trouble of the manual formation of slack, and the likelihood of an accidental change of condition during the operation of the apparatus, thereby assuring successful operation at all times. It will be readily understood by those skilled in the art, however, that many features of my invention may be used in connection with the conventional type of film feeding by means of continuous feeding and taking up sprockets and their associated unsupported loops of slack film, but I prefer to use and have illustrated my invention in connection with the feeding mechanism shown in the copending application of Mr. C. U. Bundick and myself, Serial No. 44,482 filed July 18, 1925, in which the film is automatically placed and kept under the proper condition of controlled tension.

The present invention while relating to apparatus capable of commercial use in theaters and the like, is particularly intended for use by individuals or organizations for entertainment or education. Such apparatus must not only be extremely simple in order to make successful operation by unskilled operators entirely feasible, but must be both durable and foolproof. The apparatus hereinafter described in detail embodies all of these advantageous features of operation and construction.

The control preferably embodies a single operating member in the form of a button or knob adapted by a unitary movement to control the threading or changing of films, the projection of motion pictures, the projection of the pictures as still or stereopticon views, and the rewinding together with the necessary operations incident to each.

In many types of apparatus as now utilized, all of the various mechanisms are in either continuous or intermittent operation not only during the desired feeding movement of the film, but also during the rewinding thereof. In accordance with the present invention wear on the feeding mechanism is decreased and greater ease of operation during rewinding is obtained, by throwing the feeding mechanism entirely out of operation during the rewinding period. Also, the feeding mechanism itself is preferably of such construction as not only to facilitate its manufacture, but also produce a film feed having gradually accelerative and decelerative characteristics, whereby the shock usually incident to starting and stopping the film is obviated to a very appreciable extent. This of itself tends to increase the length of life of the film, and this is further assured by using a feeding sprocket having such an area of surface and tooth contact with the film during the feeding movement as to avoid possibility of concentration of the feeding strains. This sprocket is protected during the rewinding period by a shield, the movement of which into protective position tends to strip the film from the sprocket. Preferably, there is also provided supplemental feeding mechanism suitable for slower film operation to enable study of the single pictures in succession with the desired interval of dwell for each of the pictures.

The invention further has for one of its objects the starting of the film feeding operation under such conditions that possibility of shock to the apparatus and damage to the film is greatly decreased. This is preferably obtained by the use either of a friction feed or a spring tension of such nature as to store up some of the usual starting shock due to inertia and the like.

A further object of the invention is to produce a light trap or heat shield mechanically operated automatically when the control mechanism is moved to change from projection in motion to still or stereopticon projection. This insures positive movement of the trap or shield at exactly the required time, and precludes possibility of damaging the film by reason of failure of the trap or shield to operate at the required instant.

Still another object of the invention is to provide an improved lighting, ventilating and resistance unit, whereby the lighting and resistance members are adequately and simultaneously cooled.

A still further object of the invention is to provide a case of such construction that it may effectively serve either as a carrying case or as a protective enclosure during the use of the apparatus.

Another object of the present invention is to provide an apparatus of the general character hereinbefore referred to which is adapted for use either with films in which both ends are permanently secured to different carriers, or in which only one end is secured to a carrier, or of the character in which the film is loosely wound around carriers. When the film is permanently secured either to one or two carriers, one or both ends may be of special construction to serve as protective means for the film preventing damage by heat from the light source. The construction is further such, by reason of the reversing mechanism utilized, that the use of the first type of film is in some cases particularly desirable.

Still other objects arise from the provision of a motor and light source in a single circuit whereby, in starting, the motor serves to protect the lamp. Also, the motor may be continuously operable in the same direction without cessation during still projection, threading or film changing, or reversing. This permits the use of a fan continuously effective for cooling the light source and the resistance used with it.

Other and further advantages both of construction and operation will be apparent from the following specification and drawings constituting a part thereof. In these drawings there are shown for purposes of illustration only certain preferred embodiments of the present invention, it being understood that the drawings do not define the limits of my invention as changes in the construction and operation disclosed therein may be made without departing either from the spirit of the invention or the scope of the broader claims.

In the drawings:

Figure 2 is a left side elevation of the machine;

Figure 3 is a partial side elevation broken away to show actuating parts in film threading position;

Figure 4 is a partial left side elevation broken away to show actuating parts in film threading position;

Figure 6:
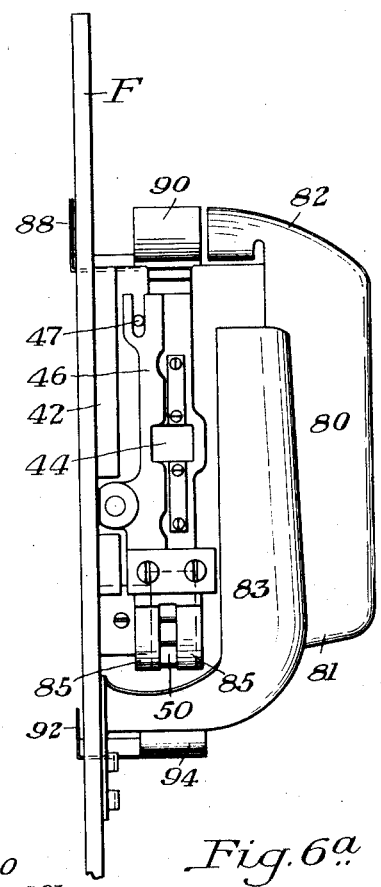
Figure 6 is a partial view taken on the line VI—VI of Figure 1 showing the right side only to illustrate the gate.
Figure 6A:
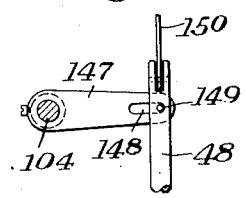
Figure 7:
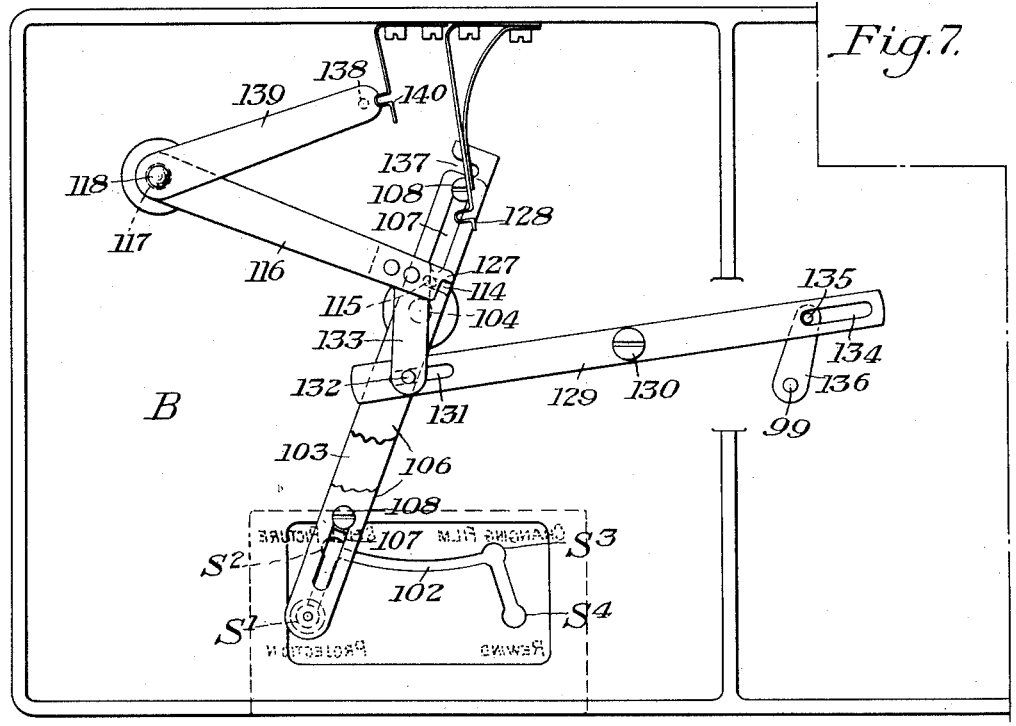
Figure 8:
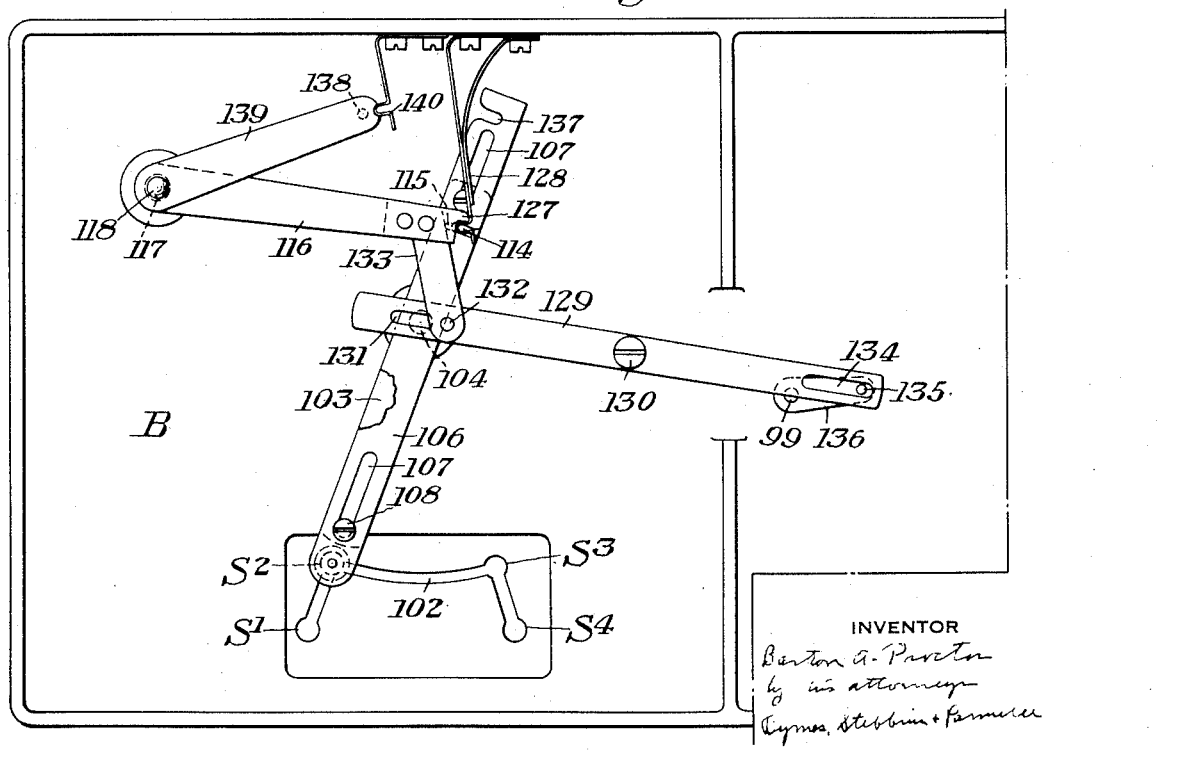
Figure 14:
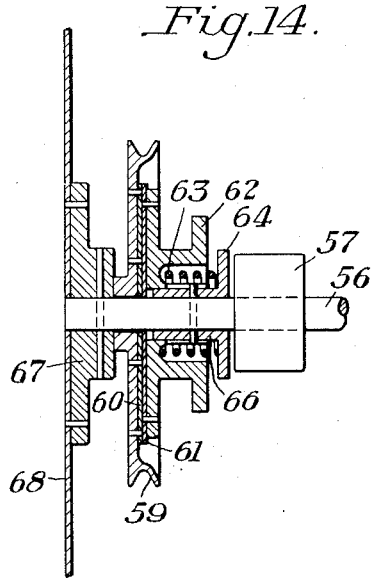
Figure 15:
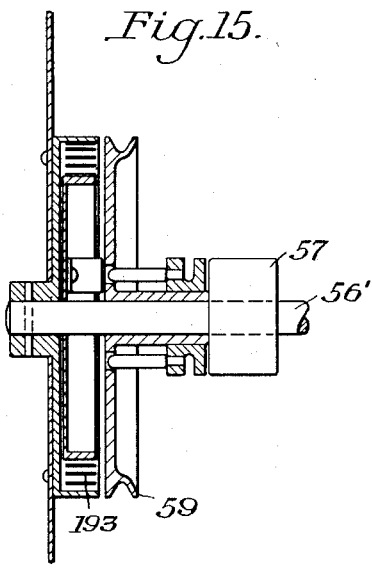
Figure 16:
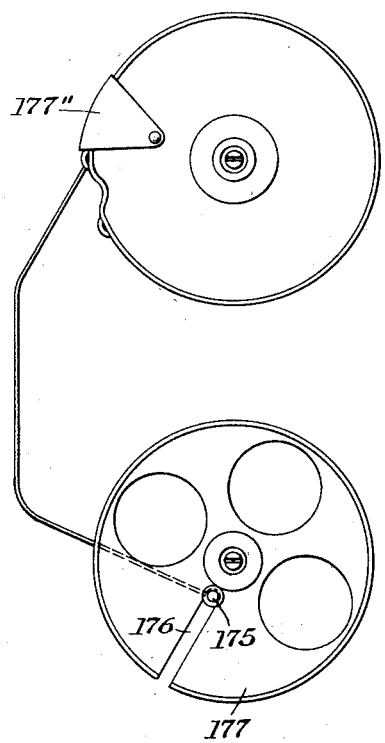
Figure 17:
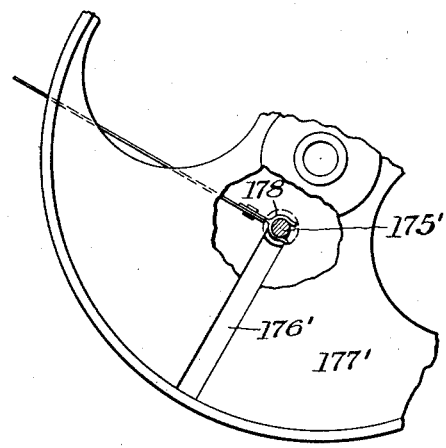

Figure 6ª is a detail view of the gate rod crank lever and associated parts;

Figure 7 is a partial bottom plan view showing actuating levers in "normal intermittent projection" position;

Figure 8 is a partial bottom plan view showing actuating levers in "still projection" position;

Figure 9 is a partial bottom plan view showing actuating levers in "film threading or changing" position;

Figure 10 is a partial bottom plan view showing actuating levers in "rewind position";

Figure 11 (Sheet 4) is a detail view showing segment and pinion for actuating film-stripping shield;

Figure 12 (Sheet 4) is a front view of same;

Figure 13 (sheet 3) is a partial section of ventilator showing the louvre-like elements thereof;

Figure 14 is a section through shutter-actuating pulley and clutch therefor;

Figure 15 is a similar view of a modification;

Figures 16 and 17 are details of a modified reel construction;

Figure 18 is a side elevational view showing the apparatus as equipped with adapting means enabling the use of larger film carriers;

Figure 19 is a side elevational view of a modified film construction;

Figure 20 is a right side elevation of a modified form showing control on right side;

Figure 21 is a case for use with a modified construction of the machine;

Figure 22 is an elevational view of a portion of one form of film which may be utilized in the apparatus disclosed herein;

Figure 23 is a detail sectional view illustrating one form of carrier construction by means of which proper centering of the reel and protective casing is obtained; and Figure 24 is a diagrammatic view illustrating the wiring of the apparatus.

Certain of the features of the present invention, and more particularly those with respect to the automatic means for maintaining the desired tension on the film are shown and claimed in the copending application of Clarkson U. Bundick and myself, Serial No. 44,482, filed July 18, 1925.

In carrying out the present invention there may be provided an apparatus comprising a supporting base B having mounted thereon a lamp and resistance containing housing H and a supporting frame F upon which are mounted the operating parts of the film feeding and controlling mechanism per se.

Preferably carried by the frame F and projecting laterally from one side thereof in predetermined spaced relationship is a pair of reel receiving spindles 2 and 3, the upper spindle 2 being adapted for the holding of a reel of film during the feeding movement thereof and adapted to effect rewinding of the film at the conclusion of the feeding movement, while the lower spindle 3 is adapted to be positively driven in timed relation with the feeding movement for coiling the film as required.

The film itself is preferably carried in a combined storage and exhibiting protector comprising a pair of containers 4 and 5 having a pivotal connection 6 whereby the containers may be relatively separated to a predetermined extent to expose the desired length of film therebetween. This construction may be substantially as disclosed and claimed in the United States Patent No. 1,440,173, granted December 26, 1922, to Herbert George Ponting and George William Ford, or may be of any other desired construction.

The lower spindle 3, which will hereafter be referred to as the driving or take-up spindle, is journaled for rotation in a suitable bearing 7 in the frame F. The back of the frame is formed with an enlarged boss 7ª through which the spindle extends, and beyond the boss there is secured to the spindle a combined brake drum 8 and friction driving member 9. The driving member 9 has a friction surface 10 with which is adapted to cooperate a second friction member 11 in the form of a disk. The disk 11 and the driving member 9 are preferably held in frictional engagement by means of springs 12 carried by the member 9 and bearing against the disk 11 through the medium of an annulus 13, the springs being held under the desired tension and the annulus being maintained in position by adjusting screws 14.

Projecting rearwardly from the disk 11 is a driving lug 15 adapted to be engaged by a clutch hereinafter described in detail by means of which the driving spindle 3 may be frictionally rotated.

Figure 5:
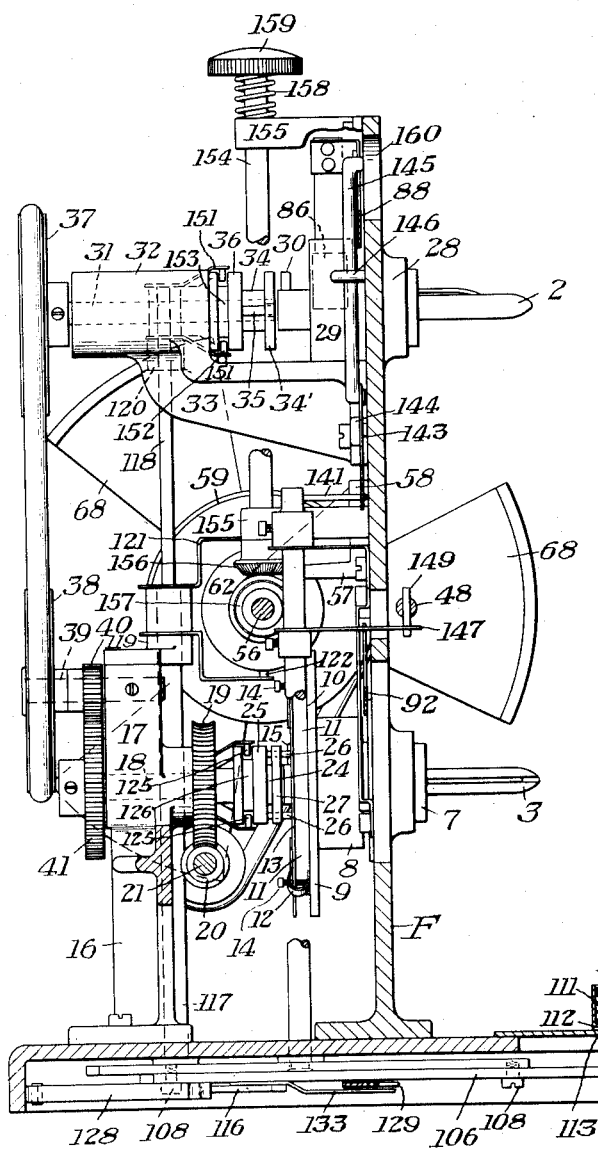
Figure 5 is a cross section on the line V—V of Figure 2 looking in the direction of the arrows.

Projecting upwardly from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located in the rear of the frame F. This shaft at its forward end is mounted in spaced bearings 22 carried by the bracket 16 and is connected to a driving motor M through a flexible coupling 23 of any desired or usual construction. By reason of this mechanism, it will be apparent that when the motor M is operated the shaft 18 will be positively driven through the worm and wheel before referred to. For transmitting this rotational movement from the shaft 18 to the spindle 3 at will there is provided a sleeve 24 secured in any desired manner to the inner end of the shaft 18 and having slidably mounted thereon a collar 25 from which project pins 26 slidable through the enlarged end 27 of the sleeve 24. By moving the collar 25 to the right as viewed in Figure 5, the pins 26 are projected into the path of travel of the driving lug 15 whereby a drive is positively transmitted to the driving spindle. This clutch will hereinafter be referred to as the driving or take up spindle clutch.

The spindle 2, which will hereinafter be designated the rewinding spindle or, when the context makes such phrasing clearer, as the delivery or supply spindle, is mounted similarly to the driving spindle 3 in a bearing 28 carried by the frame F, and has secured to its rear end a brake drum 29 from which projects a pin or lug 30. Extending in alignment with the rewinding spindle 2 is a shaft 31 suitably journaled in a bearing 32 carried by a bracket 33 illustrated as secured to the frame F. Mounted on the inner end of the shaft 31 is a sleeve 34 having an enlarged end 34' through which project pins 35 carried by a collar 36 and constituting a rewinding clutch similar in construction and operation to the construction of the driving spindle clutch. Upon movement of the collar 36 to the right as viewed in Figure 5, the pins 35 will be brought into the path of travel of the pin or lug 30 whereby the rewinding spindle 2 may be operated for effecting a rewinding of a previously displayed length of film.

For driving the shaft 31, it may conveniently have secured thereto a pulley 37 in line with a similar pulley 38 mounted on the outer end of a stub or spur shaft 39 secured in the bracket 16. Also mounted on the shaft 39 is a spur gear 40 adapted to be driven by a similar, but preferably larger gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18, and that rotative movement in turn may be imparted by either of these shafts to the respective spindles, with which they are in alignment, by suitable operation of the controlling clutches.

Mounted on the frame F adjacent the motor M and preferably on the front side of the frame is a gate section 42 preferably secured in any desired manner as by screws 43 against movement relatively to the frame. This section is preferably formed with an aperture 44 through which light may be projected as well understood in the art, and with a film guiding depression 45 extending lengthwise of the section, and intersecting the opening 44, for the travel of the film. Cooperating with the section 42 is a relatively movable section 46 preferably guided by a pin 47 projecting outwardly from the section 42, and secured to one end of a gate opening rod 48 slidable through a suitable opening in the gate section 42 and a suitable bearing 49 on the frame F. By reason of this construction, it will be apparent that when the rod 48 is moved to the left as viewed in Figure 1, it will be effective for moving the section 46 away from the section 42 to permit the removal of a film and the insertion of a new film, while movement in the opposite direction will bring the sections into cooperative relationship.

For effecting the desired intermittent feeding motion of a film in position in the gate, there may be provided a feeding sprocket 50 having film engaging teeth 51 adapted to engage apertures 52 substantially centrally positioned in the film $f$. This sprocket is mounted on a shaft 53 extending transversely through the frame F and carrying at its opposite end a star wheel 54. This star wheel, which may be of any well known construction, is adapted to be intermittently driven by means of a cam 55 secured adjacent one end of a shutter shaft 56 journaled at one end in a grease casing C within which are mounted the cam 55 and star wheel 54, and at its opposite end journaled in a suitable bearing 57 (Figure 2) carried by a bracket 58 projecting rearwardly from the frame F.

Mounted loosely on the shaft 56 adjacent the opposite end thereof, as illustrated in detail in Figure 14, is a pulley 59 having a friction face 60 adapted to be engaged by a corresponding friction face 61 on a clutch collar 62. The clutch collar is normally urged in such direction as to be in frictional driving engagement with the pulley 59 by means of a spring 63 abutting at one end against the bottom of a spring receiving recess formed in the collar and at the other end against a shoulder 64 on a spring sleeve 66 secured in any desired manner to the shaft 56 for rotation therewith. Secured to the shaft 56 outside of the pulley 59 is a hub 67 carrying a shutter 68 for operation as well understood in the art. The hub 67 and the shoulder 64 take all of the thrust exerted by the spring 63 whereby the shaft 56 as a whole is relieved from any end thrust.

Secured to the end of the driving shaft 21, and preferably substantially in line with the pulley 59 is a pulley 69 around which may pass a belt 70 for driving the pulley 59 from the drive shaft. By reason of this construction, it will be apparent that with the friction surfaces 60 and 61 in engagement, rotation will be imparted to the shutter shaft 56 from the driving shaft 21, this rotation being effective not only for operating the shutter but also for obtaining the desired intermittent operation of the film feeding sprocket.

It will readily be understood that rotation is not imparted to the shaft 56' and thence to the intermittently moving sprocket 50 until after the shaft 18 has been actuated, when the form of clutch shown in Fig. 15 is employed. Power is directly communicated from the motor M through the coupling 23, shaft 21, worm 20 and worm wheel 19 to the shaft 18 and through the previously described clutch to the take up spindle 3. Power is communicated to the sprocket 50 through the intermittent train, to which reference has been made, the shaft 56, the previously described clutch, pulley 59, belt 70 and pulley 69, the latter being secured to power shaft 21. As a consequence it will be seen that even if the clutches adapted to actuate the driving spindle 3 and the shaft 56 are moved to operative positions simultaneously, the spindle 3 will begin to revolve before movement is imparted to the intermittent sprocket 50, to which reference has been made.

Moreover, in one form of my invention the clutch in line with the operating shaft 56, as will be observed by reference to Figures 14 and 15, can be so constructed by properly choosing the length and tension of the spring 193 as to permit greater delay at the application of the power than is possible through the clutch and friction driving mechanism for spindle 3. This timed relationship is important since it draws the film $f$ over the teeth of the sprocket and seats the same in the perforations of the film before said sprocket is placed in rotation. As a result injury to the film is avoided and wear upon it is minimized.

Figure 1:
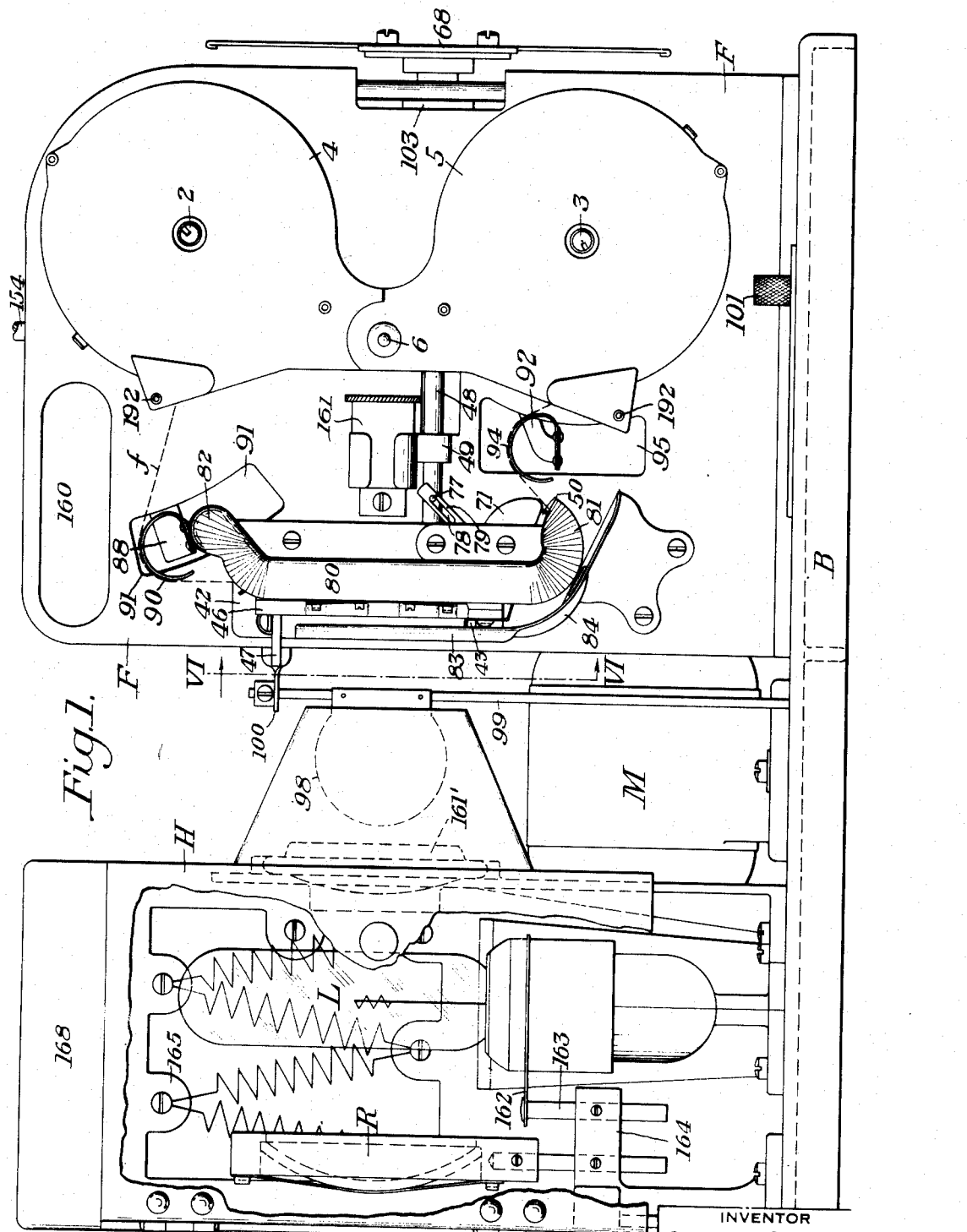
Figure 1 is a right side elevation of the machine, certain parts of the lamp housing being broken away.

Cooperating with the sprocket 50 and normally occupying the position illustrated in Figures 1, 11 and 12 of the drawings, is a stripping shield 71 carried by the inner end of a shaft 72 supported in a suitable manner by a bearing 73 constituting part of the fixed gate section 42. Also secured to the shaft 72 is a pinion 74 with which meshes an arcuate rack 75 having a pivotal mounting 76 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 1 for the purpose of opening the relatively separable gate sections, will effect rotation of the rack in a counter-clockwise direction as viewed in this figure, thereby rotating the shield in a clockwise direction. This rotational movement of the shield will be effective for engaging the film *f* and stripping the same from the sprocket preparatory to the removal of the film from the apparatus. It will remain in this position covering certain of the teeth of the sprocket during the application of a new film, or during rewinding, whereby the threading operation of the film is greatly expedited or the film protected during rewinding.

For further assisting the threading movement, the relatively fixed gate section 42 is provided with a projecting guide 80 having a generally curved contour for gradually guiding the film over the fixed gate section, the guide having a downwardly curved and inclined lower end 81 for insuring passage of the film over the sprocket and an upwardly inclined and curved upper end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower end 84 having a function corresponding to that of the curved end 82 of the guide member 80, and described in detail hereinafter. Projecting downwardly from the lower end of the movable gate section is a pair of spaced guide fingers 85, constituting a shoe, curved to generally conform to the curvature of the sprocket 50, the space between these fingers being sufficient to accommodate the teeth 51 of the sprocket. These guides cooperate in a manner, as will be readily apparent from the drawings, to permit a film to be positioned between the gate members by merely moving the same laterally relative to its normal direction of travel through the gate. This greatly lessens the time required for threading new film into position, and enables the operation to be performed satisfactorily by an unskilled operator.

In order to entirely obviate the necessity of manually producing slack or loops as heretofore required, there is provided a tension control means of the general character set forth in the application before referred to. This tension control preferably comprises braking means automatically operated by the film, and comprising an upper brake 86 cooperating with the brake drum 29 on the rewinding spindle 2 and a lower brake 87 cooperating with the brake drum 8 on the driving spindle 3. The upper brake 86 is carried by a brake lever 88 having a pivotal mounting 89 on the frame F at the rear thereof and having secured to its opposite end a film guide 90 projecting forwardly through a suitable opening 91 in the frame F. The lower brake 87 is in turn preferably carried by a curved lever 92 secured to a plate 93 loosely surrounding the boss 7$^a$ on the frame F whereby the plate as a unit may be rotated around this boss. At its opposite end the curved lever 92 is provided with a film guide 94 projecting forwardly through a suitable opening 95 in the frame F. During the feeding of a film through the apparatus all of the parts occupy the position illustrated in Figure 1 while during the threading of a film into position or the removal of a film from the apparatus, the parts occupy the position illustrated in Figure 3. In this latter position it will be noted that the guide 94 occupies such a position with respect to the curved lower end 84 of the guide member 83 as to insure the passage of a film upwardly around the guide 94 automatically upon lateral movement of the film, while the guide 90 occupies such a position with respect to the upwardly inclined curved upper end 82 of the guide member 80 as to insure passage of a film over and around the guide 90 by the operation referred to. The lever 88 is normally swung in such direction as to cause the brake 86 to contact with the drum 29 by means of a spring 96. Due to the action of this spring, the brake 86 tends to prevent too free rotation of the rewinding shaft and thereby prevents the tension on the film becoming less than that required for proper feeding. In the event, however, of tendency toward too great tension, the tension on the film causes the lever 88 to move in opposition to the action of the spring 96, thereby relieving the braking action of the brake 86 to a corresponding extent and again producing the desired tension on the film.

The lower brake 87, on the other hand, is normally so positioned as to exert no appreciable braking action on the drum 8. In the event, however, of undue tension on the film between the feeding sprocket 50 and the reel carried by the driving spindle 3, the film will be effective for swinging the lever 92 in such direction about its pivotal mounting 97 on the plate 93 as to bring the brake 87 into more effective braking engagement with the drum 8. Due to the fact that the spindle 3 is driven from the motor through a friction drive, this braking action will be effective for decreasing the driving force on the spindle 3, and consequently will relieve the tension on the film and produce the desired operating conditions between the sprocket and the lower reel. In this manner the required tension on the film to insure proper feeding is automatically produced by the mere threading of the film into position, and is automatically maintained by the operation of the tension or braking mechanism.

When the apparatus is utilized for so-called "still" projection of pictures, it is necessary to provide means in the path of travel of the light rays for protecting the film against danger of injury by reason of undue temperature conditions. For effectively shielding the film during such period, there is provided a trap or shield 98, composed of suitable material such as copper screen of suitable mesh, carried by a shaft 99 having its upper end journaled in a bearing 100 projecting from the frame F and having its lower end suitably journaled in the supporting base B. This shaft is adapted to be periodically and intermittently operated in accordance with the character of operation of the machine for bringing the shield positively into position when the apparatus is operating for the still projection of pictures and to throw it out of position for the projection of pictures in motion.

In view of the fact that the present apparatus, while not necessarily limited to any particular field of use, is primarily intended for use by persons unskilled in the art, it is desirable to simplify the control to as great an extent as possible not only for the purpose of rendering the operation easier, but for the purpose of making such operation foolproof. For this purpose there is preferably provided a single control member in the form of a knob or button 101 projecting upwardly through a substantially U-shaped slot 102 in the supporting base B. This slot is so shaped as to provide four operating stations designated, respectively, S1, S2, S3 and S4. The button 101 is adapted to be moved at will so as to occupy any one of these stations. With this button at the station S1, the respective parts of the apparatus are in such position as to insure the normal projection of pictures as usual motion pictures. With the control button at station S2, there is obtained a so-called still or stereopticon projection, the movement of the button from the station S1 to the station S2 being effective for disengaging the respective driving mechanisms which are in operation during the projection of pictures in motion. With the button in position at station S3, the respective parts of the apparatus are in such position as to permit the positioning of a film therein or the removal of a film which has just been fed therethrough. It will be understood that the movement of the button from station S2 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding. This provision of a single control member movable only in a predetermined manner and automatically effective upon movement for producing all of the necessary changes in operating conditions constitutes an important feature of the present invention, as it renders the control and operation of the apparatus extremely simple and substantially foolproof.

The control mechanism actuated by the control knob is to a large extent illustrated in Figures 7, 8, 9 and 10, inclusive, which illustrate in succession the change in the position of the parts of the control mechanism by movement of the control button successively to the respective stations. This mechanism may comprise a lever 103 keyed or otherwise secured to the lower end of a brake release rod 104 having its lower end journaled in any desired manner in the base B and its upper end journaled in a bearing bracket 105. Being secured to the brake release rod 104 which is capable only of a turning movement about its longitudinal axis, the lever 103 is restricted in its movements to rotation only. Carried by the rotating lever 103 is a combined sliding and rotating lever 106 having adjacent each end a slot 107 through each of which projects a headed pin 108 by means of which the combined sliding and rotating lever is effectively mounted on the rotating lever for rotational movement simultaneously therewith and sliding movement independently thereof. At its front end the lever 106 carries an upstanding pin 109 having a head 110 against the under side of which bears one end of a compression spring 111. The opposite end of this spring bears against a flange 112 extending inwardly from the control button 101. By reason of this construction it will be apparent that the button may be moved vertically on the pin 109 but that the spring 111 will normally be effective for urging the button downwardly. At its lower end the button has a collar 113 of a diameter to substantially conform to the contour of the slot 102 at the respective operating stations, whereby with the button in its lower position accidental movement from one of these stations is prevented.

At a point intermediate its length the combined rotating and sliding lever 106 is provided with a transversely extending recess 114 adapted to cooperate with a pin 115 projecting upwardly from a lever 116 which is secured adjacent one end on a control sleeve 117 surrounding a control rod 118, the sleeve and rod extending upwardly through the base B and journaled for rotational movement in bearings 119 carried by the bracket 16 and by an upper bearing 120 carried by the bracket 33. Adjacent its upper end the control sleeve 117 has projecting therefrom forked operating arms 121 carrying projecting pins 122 adapted to normally lie in the groove 123 of the clutch member 62 on the shutter shaft 56. By reason of this construction it will be apparent that upon rotation of the sleeve 117 in a counter-clockwise direction, as viewed in Figure 7, the clutch members 60 and 61 will be disengaged, thereby destroying the driving relationship between the main drive shaft 21 and the shutter shaft 56.

At an intermediate point the control sleeve is also provided with a similar pair of arms 124 having pins 125 normally projecting into the groove 126 of the clutch collar 25. Rotation of the sleeve in a counter-clockwise direction as just described will be effective through the arms 124 for disengaging the driving spindle clutch to thereby permit the driving spindle to move freely in either direction. Engagement of the driving spindle clutch and the shutter shaft clutch will be effective for the so-called projection of pictures in motion but not required for still or stereopticon results. This operation of the sleeve 117 is obtained by moving the control button from station S1 to station S2, or from the position shown in Figure 7 to the position shown in Figure 8, by reason of the relative movement imparted to the sleeve due to the sliding action of the lever 106. This movement will also be effective for bringing the projection 127 on the lever 116 into holding engagement with the detent spring 128 whereby the sleeve will be held in the position to which it has just been moved until such time as the control button is manually moved from station S2 to station S1.

In changing from the normal projection to the projection of still pictures, it is also desirable to move the shield or screen 98 into position. This is positively accomplished simultaneously with the rotation of the sleeve 117 through the medium of a lever 129 pivoted at its intermediate portion on a stud pivot 130 secured in the base B. At one end the lever 129 has a slot 131 within which projects a pin 132 on an extension 133 projecting from the lever 116. At its opposite end the lever 129 has a slot 134 into which projects a pin 135 extending downwardly from a crank arm 136 on the lower end of the shaft 99. Through the medium of the mechanism just described the movement of the lever 106 will rotate the lever 129 in such direction as to swing the light shield into light intercepting position. It will be noted that this movement of the light shield takes place positively in timed relation to the movement of the operating parts necessary in obtaining still projection, and thereby eliminates any possibility of injury, by heat, to the film while stationary.

It may be assumed that it is desired to change a film or to move the parts of the apparatus into such position that a film may be threaded into position therein. Under such circumstances the control button will be moved from station S2 to station S3. This movement will be effective only for rotating the brake release rod 104 and for bringing a recess 137 in the lever 106 into cooperative engagement with a pin 138 projecting upwardly from a lever 139 secured to the lower end of the control rod 118. The lever 139 is normally held in the position illustrated in Figures 7, 8 and 9 by means of a detent spring 140 cooperating therewith, as clearly illustrated in the drawings. The rotation of the brake release rod is effective for opening the gate sections of the gate, for moving the brakes 86 and 87 and their associated parts to inoperative position and for so actuating the stripper shield 71 as to effect the desired stripping movement of a film from the sprocket 50 and the shielding of the sprocket to permit the threading of a new film into position. These operations are obtained by securing to the upper end of the brake release rod a pin 141 extending into a slot 142 in one arm of a bell crank lever 143 having a pivotal mounting 144 on the back of the frame F. The opposite arm of the bell crank lever is in cooperative engagement with one end of a link 145 movable through a slide or guide 146 and having its upper end bent inwardly to extend over the brake lever 88. Movement of the control button from the station S2 to the station S3 will be effective for rotating the brake release rod 104 in a counter clockwise direction, as viewed in Figure 9, thereby rotating the bell crank lever 143 in a counter-clockwise direction, as viewed in Figure 4, and consequently rotating the brake lever 88 about its pivotal mounting 89 in opposition to the spring 96 for moving the brake 86 to inoperative position.

Movement of the lower brake is obtained simultaneously with actuation of the upper brake through the medium of a crank lever 147 secured at an intermediate point to the brake release rod. This crank lever has a slot 148 (Figure 6ª) in its free end into which projects a downwardly extending pin 149 carried by the gate control rod 48. The right hand end of the gate control rod as viewed in Figure 3 is connected by a link 150 with the plate 93, on which brake lever 92 is pivotally mounted, whereby said brake lever and the gate control rod operate in unison. Movement of the brake release rod occasioned by operation of the control button from station S2 to station S3 is effective for rotating the plate 93 and all parts carried thereby in such direction as to lower the film guide 94 in the slot 95 and bring it into such cooperative relation to the guides 80 and 83 as shown in Figure 3 as to facilitate the removal of a film or the positioning of another film. This movement of the gate control rod will also tend to separate the gate sections and will move the shield 71 into stripping and shielding position, as will be obvious.

If it is not desired to change a film, the control button may be moved from station S3 to station S4. This movement will be effective by reason of the engagement between the recess 137 and the pin 138 for rotating the control rod 118. At its upper end this control rod carries spaced arms 151 similar to the arms 121 and 124 previously described and provided with pins 152 normally lying in the groove 153 in the rewinding clutch collar 36. The rotation of the control rod 118 as occasioned by the movement of the control button from station S3 to station S4 will be such as to move the rewinding clutch into operative position, whereby the spindle 2 is connected in driving engagement with the shaft 31, this engagement being such that the film may be rewound by the continued operation of the motor M.

From the foregoing it will be apparent that the operation of a single control button performs automatically and in succession the necessary changes in the operating positions of the various parts for permitting any desired condition of operation of the apparatus. Upon movement of the control button from station S4 to station S3 the rewinding clutch will be disengaged and the lever 139 moved into cooperative engagement with the detent 140. Upon movement from the station S3 to the station S2, the recess 137 will leave the pin 138 and the brake release rod 104 will be rotated in the opposite direction to that heretofore described. Upon movement of the button from station S2 to station S1, the lever 116 will be disengaged from the detent 128 and its movement will effect reengagement of the shutter clutch and of the driving spindle clutch. At the same time, lever 129 will be restored to its original position, thereby effecting movement of the light shield to inoperative position.

It will be understood that upon the movement of the actuating lever 103 by means of the actuating control button 101 from station S3 to station S2 the above described control mechanism moves the film-engaging guides or pads 90 and 94 from a position in guiding relation adjacent the gate and the guiding members associated therewith wherein the pads form one side of a relatively short path between the supporting spindles useful in the preliminary threading of the film into the apparatus to another and operating position wherein they form one side of another and longer path through which the feeding movement of the film takes place. Such movement from such first mentioned to such second mentioned position increases the length of the film extending between such supporting spindles as a preliminary to the feeding operation.

Under certain conditions of operation, it may be desirable to intermittently actuate the film at a slower speed than that possible with the motor M, to obtain in effect the projection of a succession of pictures as still or stereopticon pictures. This may be accomplished by the provision of a supplemental driving means for the shutter shaft 56, and illustrated more particularly in Figures 2 and 5. This auxiliary driving mechanism comprises a shaft 154 mounted in bearings 155 on the back of the frame F. At its lower end this shaft carries a bevel gear 156 adapted to mesh with a similar gear 157 on the shutter shaft 56. Normally, the gears 156 and 157 are maintained out of engagement by means of a compression spring 158 effective for moving the shaft 154 upwardly. At its upper end this shaft carries a knurled actuating nut or knob 159 which may be grasped at will by an operator, thereby enabling him to bring the gears 156 and 157 into engagement for the slow rotation of the shutter shaft. At this time it will be understood that the control button will occupy a position at station S2.

To facilitate handling the apparatus, the frame F may have a portion thereof shaped to provide a handle grip 160, as clearly illustrated in the drawings.

Carried by the frame F and positioned adjustably in line with the aperture through the gate is a lens casing 161 of any usual construction adapted for the focusing of a projected picture on a desired surface. Also, any usual form of condensing lens 161' may be utilized.

The combined lighting, resistance and ventilating unit is contained within the housing H. Within this housing is mounted in any desired manner a lamp L adjustably carried by a bracket 162 having a pivotal mounting 163 in a bracket 164. Also having a pivotal mounting in the bracket 164 is a reflector R.

Secured to one side of the housing is a resistance carrying unit 165 having a suitable resistance for the lamp L. Also mounted on the housing, and preferably exteriorly thereof, is a second resistance 166 with which cooperates a control finger 167 by means of which resistance may be cut into or out of the motor operating circuit at will.

The housing H at its lower end is preferably in spaced relation to the base B to permit the free circulation of air into the housing, and the top of the housing is closed by a slatted or louvre cover 168, permitting the egress of heated air from the housing. A positive circulation of cooling air through the housing is preferably continuously maintained in such manner as to be effective both on the lamp L and the lamp resistance 165. This circulation may be maintained by means of a fan 169 of suitable construction mounted in the fan casing 170, and driven by an extension 171 of the armature shaft of the motor M.

The resistance 165 may be originally proportioned with respect to the circuit with which the apparatus is to be used and therefore requires no adjustment. At times, however, it is preferrable to operate the apparatus at varying speeds and by means of the rheostat or resistance 166 this may be effectively accomplished.

In certain instances it may be desirable to provide a case CC which may be utilized not only for the carrying or transporting of the apparatus from place to place, but which may be maintained in cooperative relation to the apparatus during the use thereof for effectively protecting the same. These desirable results may be obtained by providing the case CC with a side 172 adapted to be lowered into the position illustrated in Figure 21 to permit access to the control button 101. Where such a case is utilized it will also be necessary to provide an end 173 in line with the shutter which may be opened to permit the passage of the desired light rays, and it will be necessary to so mount rheostat 166 as to permit operation thereof through the open side 172. Such operation may be effectively obtained by mounting a rheostat 166' directly on the base B of the apparatus, as illustrated more particularly in Figure 20, and extending the control shaft 174 for the finger 167' laterally through the frame F, whereby it will occupy a position adjacent the control button 101 and will be accessible to an operator through the open side 172.

Heretofore considerable difficulty has been experienced in the manufacture of cams of such contour as to effectively cooperate with the star wheel utilized for driving the sprocket. I have found that very desirable results may be accomplished by a multi-part construction as illustrated more particularly in Figure 4, in which the cam 55 is shown as having all of the portions lying in a common plane normal to the axis of rotation constructed from an integral member. This is possible by reason of the fact that such member may be easily shaped in a lathe or other apparatus. The feeding portion 55ª of the cam, however, which as above described is of such shape as to give a gradually accelerative and decelerative movement to the film, is preferably constructed as a separate member whereby it may be heat treated or hardened in any desirable manner or may be of special material possessing the desired characteristics. Not only does such a construction facilitate manufacture of the cam, but it enables the working part of the cam to be readily replaced at will by another member when the cam becomes worn out or when it is desired to utilize a different contour for some particular purpose.

In some cases it may be desirable not to utilize a film holder of the general nature shown in the Ponting and Ford patent before referred to, in which case there may, for example, be used any desired modification thereof. In Figure 16 of the drawings there is shown such a modification, in which the lower end of the film is provided with a pin 175 adapted to be engaged in a slot 176 extending in a generally radial direction through the sides of the lower reel 177. Such a construction enables the film to be quickly secured to the lower reel and at the same time provides such a connection that the end of the film is automatically disengaged from this reel when the rewinding operation is substantially completed. In case such a construction is utilized, the shield 71 for the sprocket is particularly important as it protects the sprocket teeth from injury by reason of travel of the pin 175 through the gate. Furthermore, the pin 175 prevents possibility of the end of the film completely entering the other carrier during rewinding. This insures ready accessibility of the free end at all times. The upper carrier to which one end of the film is preferably permanently secured by means of a length of fire resisting material, preferably has a cover 177" adapted to be moved into position to protect the film during shipment or storage. Such a film holder is described and claimed in my co-pending divisional application, Serial Number 332,381, filed January 16, 1929.

In still other cases it may be desired to use a slightly modified construction, as illustrated in Figure 17 in which the pin 175' slides in a slot in the lower reel 177', as before described, but which slot has its outer end closed to prevent the complete release of the pin. In such cases the film may have secured to one end a spring clip or clips 178 adapted to be easily slipped over the pin to establish the desired film feeding connection. These clips also function to maintain accessibility of the film end. Such a construction is described and claimed in my co-pending divisional application, Serial Number 332,884, filed January 16, 1929.

From a consideration more particularly of Figure 24, it will be apparent that the motor M and the lamp L are connected in parallel in a common circuit having a current controlling switch 179 by means of which the current may be simultaneously supplied to or cut off from the lamp and motor. This circuit is highly desirable for the reason that lamps as required for use in apparatus for the projection of pictures are easily damaged if excessive current is supplied thereto in starting. By reason of the connection of the lamp and motor, the motor or resistance 166 initially takes relatively more current, thereby automatically protecting the lamp until the motor comes up to speed. By that time the lamp has reached such a temperature that it may take its full share of current. Furthermore, this provides an entirely separate motor circuit enabling the motor to continuously operate during the use of the apparatus. As the fan is driven by the motor, the cooling air from the fan is continuously effective not only during the projection of pictures in motion, but also during the projection as still or stereopticon pictures during the film changing and during the rewinding.

In Figure 19 there is shown more or less diagrammatically a modified form of film construction in which the film f' has at either or both ends a length of fire resisting material such as asbestos, copper or the like. By reason of this construction, when the film has reached the limit of its travel in one or both directions, the fire resisting material will be in position to intercept the light rays from the light source, and this will insure absolute safety to the film. As shown in Figure 22, the film may be constructed, as by forming it with a window W, so that when the window comes opposite the sprocket, the feeding movement of the film will stop. The window will be so positioned that when cessation of feeding occurs the fire resisting material will be in light intercepting position. This window also tends to protect the film during stripping from the sprocket preparatory to rewinding.

The forms of film construction illustrated in Figures 19 and 22 and described above and mechanism cooperating therewith are shown and claimed in my co-pending divisional application, Serial Number 332,880, filed January 16, 1929.

Figure 18 illustrates still another embodiment of the invention rendering a standard apparatus capable of use with film carriers of much greater diameter. This results from the use of projecting arms 180 and 181 preferably secured to the frame F by thumb nuts and screws 182, by means of which the relative angular adjustment of the arms may be varied. Each arm carries a spindle 183 adapted to receive a reel 184, which reels are of such diameter as to render use of the same on spindles 2 and 3 impossible. Secured to the spindle of the arm 180 is a gear 185 adapted to be connected with a gear 186 in any desired manner, as indicated in dotted lines in Figure 18, by means of which the upper reel may be rotated for rewinding a length of film. The spindle 2 may have placed thereon a guide pulley 187 preferably loose on the spindle so as to either rotate or slide thereon. This pulley may be of the type having a depressed central portion to reduce danger of scratching the main film body.

The lower spindle 3 has a combined guide pulley 188 and drive pulley 189 secured on the spindle against rotative movement. The spindle 183 on the arm 181 also carries a pulley 190. By passing a belt 191 around the pulleys 189 and 190, the lower reel 184 may be continuously driven for take up purposes. The film being threaded as indicated, the brake and tension mechanism is operative as before described, it being understood, however, that if desired, this mechanism may be duplicated for the extension or adapter arms.

In Figure 1 of the drawings the film carriers are shown as being enclosed and as having pins 192 serving to prevent overrunning of the film and protect the same generally. This protecting means may obviously be in the form of a casing or magazine, a pin, flange or roller.

The combined brake and tension control tends to produce a uniform film feed and is adaptable to apparatus of the well known type utilizing prisms instead of shutters for projecting purposes. In such cases the tension control insures the required synchronization and registration of successive pictures.

The construction and location of the gate and sprocket enable these parts to be easily removed and other parts substituted for the accommodation of films of different widths. This affords increased flexibility in the use of the apparatus whereby it is not limited to films of any one width.

In Figure 15 there is shown a modified form of shutter controlling clutch adapted to serve as inertia absorbing means when the clutch is first rendered operative. In this embodiment of the invention there is provided a spring 193 constituting the medium through which drive is transmitted. In actual operation, after the clutch is engaged, there will be a preliminary period during which energy will be stored up in the spring before the shutter shaft 56 is rotated. This relieves the entire apparatus from any starting shocks or strains.

Reference has heretofore been made to the desirability of having the film properly position itself automatically upon a bodily lateral movement thereof relative to its normal direction of travel through the gate. It is likewise desirable to have the construction of the containers 4 and 5 such that a movement of the type referred to will also properly position them and also the reels carried thereby. A construction for this purpose is illustrated in detail in Figure 23 in which the container 5 has a projection 193 adapted to contact with the bearing 7 upon sliding the container onto the spindle, and thereby center the container. The reel 5ª includes a sleeve 194, the inner end of which also abuts against a portion of the bearing 7 and thereby centers the reel with relation both to the spindle and the container, by the movement described. It will be obvious that the container 4 will be of similar construction. These features of my invention are described and claimed in my co-pending divisional application, Serial Number 332,879, filed January 16, 1929. Attention is also directed to my co-pending application, Serial Number 332,883, filed January 16, 1929, which shows and claims certain features similar to those hereinabove described.

Throughout the foregoing description reference has been made generally to projecting apparatus. The apparatus without change, however, is capable of use for regular photographic purposes in the taking of pictures, and in the handling of films of different types.

Certain advantages of the present invention arise from the provision of an apparatus of the general nature herein contemplated having a simplified control, preferably in the form of a single operating member.

Further advantages of the invention arise from the provision of a construction of such nature that a film may be easily and quickly threaded into operating position without the necessity of bringing the hands of the operator into contact with the film, or in which a film may be readily removed from the apparatus.

Still further advantages arise from the provision of an openable gate adapted to permit the ready insertion or removal of the film and having cooperating therewith guiding means of such nature as to insure the travel of the film in the desired direction merely upon a bodily lateral movement thereof relative to the normal direction of travel of the film through the gate.

Still further advantages arise from the utilization of a mechanism in an apparatus of the character referred to of such nature as to make it unnecessary for an operator to manually form loops or slack in the film, and operative for maintaining tension on the film variable only within certain defined limits, such mechanism preferably cooperating with the guiding means for the film in such manner that the film is automatically positioned with respect thereto upon a movement of the character set forth.

Additional advantages arise from the provision of a positively actuated light shield, from the provision of film stripping and sprocket shielding means, from the multi-part cam described and from the combined lighting resistance and ventilating unit of a construction in which both the resistance and the lamp are simultaneously cooled by a single means.

I claim:

1. In a film handling apparatus, operable mechanism for moving a film to project or expose the same, operable means for taking-up said film, a source of power for said mechanism and said means, and sequential control means connecting said mechanism and said taking-up means and said source of power including means for initiating the operation of said apparatus by applying said source of power to said taking-up means and means for applying said source of power to said moving mechanism after the initiation of the taking-up means.

2. In a film handling apparatus, two spaced film-moving means for the same film, a constantly rotating element for driving both of said means, a first operable means for transmitting the power of said rotating element to one of said film-moving means for driving the same, a second operable means independent of said first transmitting means for transmitting the power of said rotating element to the other of said film-moving means for driving the same, said second transmitting means including power-absorbing devices for delaying the transmission of such power by said transmitting means, a movable actuating member, and connections between said actuating member and said first and second transmitting means for rendering both of said transmitting means operative upon one movement of said actuating member and inoperative upon another movement thereof.

3. In a film handling apparatus, mechanism for moving a film to project or expose the same, means including a motor for driving said mechanism, means for bringing said film into operative relation with said mechanism, and sequential control mechanism interconnecting both of said means and movable first to operate said means for bringing said film into operative relation with said mechanism and thereafter to operate said means for driving said film moving mechanism.

4. In a film handling apparatus, mechanism for moving a film to project or expose the same, a source of power, means for connecting said mechanism with said source of power, means for bringing said film into operative relation with said mechanism, and control mechanism, said control mechanism including a movable actuating member, a plurality of operating stations, mechanism interconnecting said actuating member and both of said previously mentioned means for initiating the operation of one of said means upon the movement of said actuating member to one of said stations and for actuating the other of said means upon the movement of said actuating member to another of said stations.

5. In a film handling apparatus, mechanism for moving a film to feed the same, means for bringing said film into operative relation with said film-moving mechanism, a taking-up member for said film, a source of power, means for applying power from said source to said taking-up member, and sequential control means interlocking both of said means and effective successively to actuate first said means for bringing said film into relation with said film-moving mechanism and then to operate said means for applying power from said source to said taking-up member.

6. In a film handling apparatus, mechanism for moving a film to feed the same, means to bring said film into operative relation with said mechanism, means for taking up said film, and sequential connective means interlocking said previously mentioned means and assuring the inoperativeness of said means for taking up said film until said other mentioned means has brought the film into operative relation with said feeding mechanism.

7. In a film handling apparatus, a feeding member, means for operating said feeding member, means for initially bringing the film into operative relation with said feeding member, means for taking-up the film fed by said feeding member, and sequential control mechanism for all of said means, said control mechanism including a movable actuating member and connections between said actuating member and all of said means for operating said means for bringing the film into operative relation with said feeding member upon the first portion of the movement of said actuating member, for actuating said taking-up means upon a succeeding movement of said actuating member, and for actuating said means for operating said feeding member upon a later succeeding movement of said member.

8. In a film handling apparatus, an openable gate through which a film travels, means to close the same, mechanism for moving said film to feed the same, a motor, means to bring said mechanism into operative relation with the motor, means to bring said film into operative relation with said film-moving mechanism, sequential movable control mechanism interconnecting all of said previously mentioned means, and means for moving said control mechanism for first operating said means for closing said gate and said means for bringing said film into operative relation with said film moving mechanism and thereafter for operating said means to bring said mechanism into operative relation with said motor.

9. In a film handling apparatus, an openable gate through which a film passes, means to close said gate, mechanism for moving said film to feed the same, means to bring said mechanism into operative relation with a source of power, means for bringing said film into operative relation with said film-moving mechanism, and sequential control mechanism for all of said means, said control mechanism comprising a plurality of operating stations, a movable actuating member, and means, operatively connecting said actuating member and all of said means, for closing said gate and operating said means for bringing said film into operative relation with said feeding mechanism upon movement of said member from a first of said stations to a second thereof and for operating said means for bringing said mechanism into operative relation with a source of power upon the movement of said member from said second of said stations to said third station, said second station being disposed between said first and third stations.

10. In a film handling apparatus, an openable gate through which a film passes, mechanism for feeding said film, means for bringing said feeding mechanism into operative connection with a source of power, means for bringing said film into operative relation with said feeding mechanism, mechanism for taking up said film, means to drive said taking up mechanism, and sequential control means interconnecting said gate, said means for bringing said film into operative relation with said feeding mechanism, said means for driving said take-up mechanism and said means for driving said feeding mechanism and necessarily effective first to close said gate and to actuate said means for bringing said film into operative relation with said feeding mechanism and thereafter to actuate said means for driving said taking up mechanism and to actuate said means for driving said feeding mechanism.

11. Apparatus comprising mechanism for feeding a film, said mechanism including a toothed member, a source of power, means for operatively connecting and disconnecting said toothed member and said source of power, means for shielding the film from the teeth of said member, and sequential control mechanism interlocking said connecting and disconnecting means and said shielding means for disconnecting said toothed member from said source of power before said shielding means can become effective.

12. In a film handling apparatus, mechanism for feeding a film, said mechanism including a toothed member, a source of power, means for operatively connecting and disconnecting said toothed feeding member with said source of power, means for bodily removing the film from said feeding mechanism, and sequential control mechanism interconnecting said connecting means and said bodily removing means and effective to render said means successively operative.

13. In a film handling apparatus, two film supporting members, mechanism for feeding a film from one of said members toward the other, means for rendering said feeding mechanism operative and inoperative, mechanism for controlling the tension of that portion of the film between said members, means for moving said tension control mechanism into operative engagement with the film, and sequential control mechanism interlocking both of said means and effective to operate said moving means and actuate said feeding means in timed relation.

14. In a film handling apparatus, two film supporting members between which a film extends, means for placing that portion of the film between said members under a predetermined condition of tension, toothed means for feeding the film from one of said members to the other, means for rendering the teeth of said feeding means inaccessible by the film, and control mechanism interlocking said tension means and said means for rendering the teeth of said feeding means inaccessible by the film and effective to operate said two last-previously mentioned means in timed relation.

15. In a film handling apparatus, two carriers between which a film extends, means engaging the film between said carriers for intermittently feeding the film from one of said carriers toward the other, means for continuously driving said last mentioned carrier whereby the film fed thereto by said intermittent feeding means is coiled thereupon, means for initially increasing the length of film disposed between said carriers whereby compensation may be secured for the difference in character of movement of said carriers and said intermittent feeding means, and sequential control mechanism interlocking said means for continuously driving said carrier and said means for lengthening the film between said carriers and effective for operating said means in predetermined sequential relation.

16. In a film handling apparatus, mechanism to support a film in said apparatus, mechanism for moving said film to feed the same, means for driving said film moving mechanism, operable means for initially positioning said film in operative relation with said film-moving mechanism, mechanism for taking up said film, means for driving said taking-up mechanism, operable means for initially increasing the length of film extending between said supporting mechanism and said taking-up mechanism, and sequential control means interconnecting all of said means and necessarily effective to operate said previously mentioned means in the following succession: first said means to bring said film into relation with said film feeding mechanism and the means initially to increase the length of the film; second said means to drive said taking-up mechanism; and third said means to drive said feeding mechanism.

17. In a film handling apparatus, a member to support a film in said apparatus, mechanism for moving said film, means for initially positioning said film in operative relation with said film moving mechanism, mechanism for taking up said film, means for initially subjecting all of the portion of said film between said supporting member and said taking up mechanism to a predetermined condition of tension, means for driving said taking up mechanism, means for driving said film moving mechanism, and sequential control mechanism interconnecting all of said means for operating all of said means in sequential relation.

18. In a film handling apparatus, mechanism for supporting a film in said apparatus, an openable gate through which said film passes, means for closing said gate, mechanism for moving said film to feed the same, operable means for initially positioning said film in operative relation with said film moving mechanism, operable means for initially subjecting the portion of said film between said supporting mechanism and said taking up mechanism to a predetermined condition of tension, mechanism for taking up said film, means for driving said taking up mechanism, means for driving said film moving mechanism, and sequential control mechanism interconnecting all of said means and assuring the operation of all of said means in sequential relation.

19. In a film handling apparatus, mechanism for supporting a film in said apparatus, an openable gate through which said film passes, means for closing said gate, mechanism for moving said film to feed the same, means for driving said film moving mechanism, means for initially positioning said film in operative relation with said film moving mechanism, mechanism for taking up said film, means for driving said taking up mechanism, means for initially subjecting the portion of said film between said supporting mechanism and said taking up mechanism to a predetermined condition of tension, and sequential control means interconnecting said previously mentioned means and effective to operate the same in the following succession: first said means for initially positioning said film into relation with said film moving mechanism and said means for closing said gate and said means for subjecting said film to the desired condition of tension; second said means for driving said taking-up mechanism; and third said means for driving said film moving mechanism.

20. In a film handling apparatus, mechanism from which a film may be unrolled while said film is being projected and upon which said film may thereafter be rewound, mechanism upon which said film may be wound as it is being projected and from which it may thereafter be unrolled as it is being rewound, an openable gate through which said film passes disposed between said mechanisms, means to feed said film intermittently to project the same, means for compensating for the difference in character of movement of said mechanism and said feeding means during the projecting cycle, and sequential control means interconnecting said gate, said compensating means, said second mechanism, said feeding means, and said first mentioned means and necessarily operative to close said gate, to actuate said compensating means, said second mentioned mechanism and said feeding means and thereafter to render inoperative said second mentioned mechanism and said feeding and said compensating means and to open said gate and to actuate said first mentioned mechanism.

21. In a film feeding apparatus, a member from which a film can be unrolled while said film is being fed and by which said film can thereafter be rewound, means for applying power to said member to operate said member in a rewinding direction, a member for feeding said film from said first mentioned member, means for bringing said feeding member into operative connection with a source of power, a member by which a film may be wound after it has been fed and from which it may thereafter be unrolled while said film is being rewound, means for bringing said film into operative relation with said film feeding member, means for removing said film from said feeding member, and sequential control mechanism interconnecting all of said means and assuring the operation of said means for bringing said film into operative relation with said feeding member before the operation of said means for bringing said feeding member into operative connection with the source of power, and assuring the operation of said means for removing said film from said feeding member before the operation of said means for applying power to said first mentioned member to operate said member in a rewinding direction.

22. In a film handling apparatus, a member from which a film can be unrolled while the film is being fed and by which the film can thereafter be rewound, means for applying power to said member for operating the same in a rewinding direction, a member for feeding the film from said first-mentioned member, means for operatively connecting said feeding member and a source of power, a member to which the film is fed by said feeding member and by which it is thereupon wound and from which it can thereafter be moved while the film is being rewound by said first mentioned member, means for bringing the film into operative connection with said feeding member, and sequential control mechanism interconnecting all of said previously mentioned means and assuring the operation of said means for bringing the film into operative relation with said feeding member before the operation of said means for connecting said feeding member and the source of power, and assuring the inoperativeness of said means for connecting said feeding member and the source of power before the operation of said means for applying power to said delivery member for rewinding the film.

23. Film handling apparatus which comprises mechanism for feeding a film, means for bringing the film into operative relation with said film feeding mechanism, means to connect said film-feeding mechanism with a source of power, means to disconnect said film-feeding mechanism from said source of power, means bodily to remove said film from said film-feeding mechanism, means to rewind said film, and sequential controlling mechanism interconnecting all of said means and necessitating the operation of all of said means in the sequence in which they are herein mentioned.

24. In a motion picture apparatus, operating mechanism movable to occupy a normal projection position, a still projection position, a film threading position, and a rewinding position, a single actuating member, a plurality of stations corresponding to such positions to which said actuating member may be bodily moved, and connections between said actuating member and said operating mechanism for moving said operating mechanism to each of said positions upon the movement of said actuating member to the corresponding station.

25. In a motion picture apparatus, an openable gate, operable means for feeding a film therethrough in one direction, operable means for rewinding a film therethrough in the other direction, and control mechanism for said gate and both of said means, said control mechanism having a normal projection position, a film-threading position, a rewinding position, a single actuating member bodily movable to each of said positions, connections between said actuating member and said film-feeding means for rendering said feeding means operative upon the movement of said actuating member to said normal projection position and for rendering said film-feeding means inoperative upon the movement of said actuating member to said still projection position, connections between said actuating member and said gate for opening said gate upon the movement of said actuating member to said film-threading position, and connections between said actuating member and said rewinding means for rendering said rewinding means operative upon the movement of said actuating member to said rewinding position.

26. In a motion picture apparatus, operating mechanism movable to occupy a normal projection position, a still projection position, and a rewinding position, a motor for driving said apparatus through said operating mechanism, a single actuating member, a plurality of stations corresponding to such positions to which said actuating member may be bodily moved, and connection between said actuating member and said operating mechanism for moving said operating mechanism to each of said positions upon the movement of said actuating member to the corresponding station without affecting the operation of said motor.

27. In a motion picture apparatus, operating mechanism movable to occupy a normal projection position, a still projection position, a film threading position, and a rewinding position, and control mechanism therefor, said control mechanism including a single actuating member, a plurality of stations corresponding to such positions to which said actuating member may be bodily moved, connections between said actuating member and said operating mechanism for moving said operating mechanism to each of said positions, and means for locking each of said connections in the positions to which it is moved upon the movement of said actuating member to the corresponding station and into operative relation with said locking means.

28. In a film handling apparatus, driving mechanism continuously operating in one direction, a delivery member, a first means for operatively connecting said driving mechanism and said delivery member whereby a film attached thereto is rewound thereupon, a take-up member and a feeding member for the film supported upon said delivery member, a second means for operatively connecting said driving mechanism and said feeding and take-up members whereby the film is moved in a feeding direction, and control mechanism interlocking said first and second means for selectively operating the same without affecting said driving mechanism, said control mechanism comprising a bodily movable actuating member, a plurality of stations to which said actuating member is movable at will, connections between said actuating member and said first means whereby said first means is rendered operative by the movement of said actuating member to one of said stations, and connections between said actuating member and said second means whereby said second means is rendered operative upon the movement of said actuating member to another of said stations.

29. In a film handling apparatus, feeding and taking-up means for a film, rewinding means for the film, driving mechanism, a first means for applying the power of said mechanism to drive said feeding and taking-up means, a second means for applying the power of said mechanism to drive said rewinding means, movable control mechanism for said two power-applying means, three operating stations to which said control mechanism can be moved, and an actuating member for moving said control mechanism to said stations, said control mechanism including connections with said first power-applying means for operating said first means upon the movement of said control mechanism to the first of said stations and for rendering said first power-applying means inoperative upon the movement of said control mechanism to the second of said stations and said control mechanism including connections with said second power-applying means for rendering said second means effective upon the movement of said control mechanism to said remaining station, said second station being disposed in intermediate relation to said first and remaining stations.

30. In a film handling apparatus, feeding and taking-up means for a film, rewinding means for the film, driving mechanism, a first means for applying the power of said mechanism to drive said feeding and taking-up means, a second means for applying the power of said mechanism to drive said rewinding means, movable control mechanism for said two power-applying means, four operating stations to which said control mechanism can be moved, and an actuating member for moving said control mechanism to said stations, said control mechanism including connections with said first power-applying means for operating said first means upon the movement of said control mechanism to the first of said stations and for rendering said first power-applying means inoperative upon the movement of said control mechanism to the second of said stations and said control mechanism including connections with said second power-applying means for rendering said second means effective upon the movement of said control mechanism to one of said remaining stations, said second station being disposed in intermediate relation to said first and said last previously mentioned station, and for rendering said second power-applying means inoperative upon the movement of said control mechanism to said remaining stations.

31. In a film handling apparatus, mechanism to support a film in said apparatus, a member for feeding the film, mechanism for driving said film feeding member, operable means for actuating said driving mechanism, means for initially positioning said film in operative relation with said film feeding member, mechanism for taking up said film, means for actuating said taking up mechanism, means for initially increasing the length of film between said supporting mechanism and said taking-up mechanism, and control mechanism interconnecting said actuating means, said film-positioning means, and said film-lengthening means for controlling all of said means.

32. In a film handling apparatus, mechanism for supporting a film in said apparatus, an openable gate through which said film passes, means for closing said gate, a member for feeding the film, mechanism for driving said film feeding member, operable means for actuating said mechanism for driving said feeding member, a member for taking-up said film, mechanism for driving said taking-up member, operable means for actuating said means for driving said taking-up member, means for initially increasing the length of film between said supporting mechanism and said taking-up member, and control means interconnecting both of said actuating means, said film-lengthening means, and said gate closing means.

33. In a film handling apparatus, an openable gate, a member for feeding a film therethrough, means for driving said member, operating means for said driving means, and control mechanism for said gate and said operating means, said control mechanism including a plurality of stations, a movable actuating member, connections between said actuating member and said gate for opening said gate upon the movement of said actuating member to one of said stations and for closing said gate upon the movement thereof to another of said stations, and connections between said actuating member and said operating means for rendering said operating means effective upon said feeding member upon the movement of said actuating member to still another of said stations.

34. In a film handling apparatus, a first film carrier, a second film carrier, an apertured gate disposed between said carriers, mechanism for moving a film from the first of said carriers toward the second thereof through said gate past the aperture thereof, a shutter cooperating with the aperture of said gate, a source of power, a first means for applying power from said source to said shutter for operating the same, a second means for applying such power to said first film carrier for revolving the same in a rewinding direction for the purpose of moving the film from said second carrier through said gate past the aperture thereof and rewinding the same upon said first carrier, and control means interconnecting said first and second power-applying means for rendering said first means inoperative during the operation of said second means whereby the shutter is inoperative during the rewinding of the film.

35. Film feeding apparatus, comprising a plurality of carriers for a film extending therebetween, a feeding member engaging the film between said carriers, means for effecting movement of said film in one direction from one of said carriers to another, means for effecting movement of the film in the other direction from said last previously mentioned carrier to said first mentioned carrier, unitary mechanism for driving said feeding member and both of said moving means, actuating means for disconnecting and connecting said feeding member and said driving mechanism, a shielding member movable from a first position wherein it is situated between the film and the area of operation of said feeding member whereby the film is protected from said feeding member, to a second position outside of such area, whereby engagement between said feeding member and the film is permitted, and control means interlocking said shielding member, said actuating means and both of said moving means, and effective for operating said actuating means for disconnecting said feeding member from said driving mechanism and for positioning said shielding member in such first position during the operation of one of said moving means and for operating said actuating means for connecting said feeding member and said driving mechanism and for positioning said shielding member in said second position during the operation of said other moving means.

36. Film feeding apparatus, comprising a feeding member adapted to engage a film, means for effecting movement of the film in one direction, means for effecting movement of the film in the opposite direction, a member substantially coextensive with the area of operation of said feeding member upon the film and movable to a position embracing completely said area of operation, for the purpose of shielding said film therefrom during the movement of said film in one direction, and control mechanism interconnected with said shielding member and with one of said means for effecting movement of the film for moving said shielding member and for actuating said moving means.

37. In a film feeding apparatus, a delivery spindle, a member for engaging a film supported by said delivery spindle to feed the same therefrom, mechanism for driving said feeding member, a take-up spindle, means for rewinding the film from said take-up to said delivery spindle, means necessarily effective for the bodily removal of the film from said feeding member prior to the operation of said rewinding means, and means interconnecting said rewinding means and said driving mechanism for stopping the operation of said driving mechanism during the operation of said rewinding means.

38. In a film handling apparatus, film feeding means, a motor, mechanism for connecting said film feeding means and said motor, operable means for rendering said connecting mechanism operative and inoperative, an openable gate through which the film travels, means for bodily removing the film from said feeding means, and control means connecting said means for rendering said connecting mechanism operative and inoperative, said means for bodily removing the film, and said gate and effective for rendering said connective means inoperative, actuating said means for the bodily removal of the film, and opening said gate.

39. In a film feeding apparatus, mechanism to feed a film, said mechanism including a toothed feeding member, means to bring said film into operative relation with said feeding member, a clutch to bring said mechanism into operative connection with a source of power, said clutch including a driving and a driven element one of which is movable into operative relation with the other, means for rendering the teeth of said feeding member inaccessible by the film, and control mechanism interconnecting the movable elements of said clutch and both of said means for operating all of the same.

40. Film feeding apparatus which comprises mechanism to feed a film, means to bring said film into operative relation with said mechanism, a clutch to bring said mechanism into operative connection with a source of power, said clutch including a driving and a driven element one of which is movable into operative relation with the other, and sequential control means interconnecting the movable member of said clutch and said means and necessarily assuring the successive operation of said clutch and said means.

41. In a film handling apparatus, two film moving means adapted to engage the same film at the same time, a source of power, connecting mechanism between the source of power and each of the two film moving means for driving them in one direction, each of the connecting mechanisms including a clutch comprising a driving and a driven element, one of which is movable into operative relation with the other for operating said clutch, and control mechanism for said clutches including a single movable actuating member and connections between said actuating member and the movable elements of each of said clutches whereby both film moving means are controlled by the movement of the actuating member.

42. In a film handling apparatus, a delivery member for a film upon which the film may be rewound, a take up member for the film, a member for feeding the film from said delivery member toward said take up member, a source of power for all of said members, a clutch for operatively connecting and disconnecting each of said members with said source of power, each of said clutches including a driving element and a driven element one of which is movable into operative relation with the other whereby said clutch is operated, and control means, said control means including a bodily movable actuating member, two operating stations between which said actuating member may be moved, and sequential control mechanism connecting said actuating member with the movable elements of each of said clutches whereby upon the movement of said actuating member to one of said stations said clutches controlling said feeding member and said take up member are rendered inoperative and said clutch controlling said delivery member is rendered operative and upon movement to the other of said stations said clutch for said delivery member is rendered inoperative and said clutches for said feeding member and said taking up member are rendered operative.

43. In a film handling apparatus, a delivery member upon which a film may be rewound, a feeding member, a take-up member, operating mechanism for said delivery and feeding members, a clutch for operatively connecting said operating mechanism and said feeding member for the purpose of moving a film from said delivery member toward said take-up member, a clutch for operatively connecting said operating mechanism and said delivery member for the purpose of moving a film from said take-up member toward said delivery member for rewinding the film, each of said clutches including a driving and a driven element one of which may be brought into operative relation with the other for the purpose of actuating said clutch, and control mechanism, said control mechanism including a movable actuating member, and mechanism connecting said actuating member and one of the elements of each of said clutches, two operating stations to which said member may be moved, and connections between said operating member and the movable elements of each of said clutches whereby when said actuating member is moved to one of said stations one of said clutches is rendered inoperative and upon movement of said actuating member to the other of said stations the other of said clutches is rendered operative and said first mentioned clutch rendered inoperative.

44. A film handling apparatus comprising a unidirectional source of power, a delivery spindle, a clutch for operatively connecting and disconnecting said delivery spindle and said source of power, a take-up spindle, a clutch for operatively connecting and disconnecting said take-up spindle and said source of power, a shutter, film feeding means, a clutch for operatively connecting and disconnecting said feeding means and said shutter and said source of power, each of said previously mentioned clutches containing a driving element and a driven element one of which is movable into operative relation with the other for actuating said clutch, and control mechanism, said control mechanism including a movable actuating member and mechanism connecting said member and the movable element of each of said clutches and effective for moving the same whereby the clutch is operated upon the movement of said actuating member.

45. Film handling apparatus comprising a unidirectional source of power, a delivery spindle, a clutch for operatively connecting said delivery spindle and said source of power, a take-up spindle, a clutch for operatively connecting and disconnecting said take-up spindle and said source of power, a shutter, film feeding means, a clutch for operatively connecting and disconnecting said feeding means and said shutter and said source of power, each of said previously mentioned clutches including a driving and a driven member one of which is movable into operative relation to the other, and control mechanism for all of said clutches, said mechanism including an actuating member, said member being movable at the will of the operator to a plurality of predetermined stations, and means connecting said member and the movable member of each of said clutches, whereby the movement of said actuating member to said stations is effective to render said clutches predeterminedly operative or inoperative.

46. A film handling apparatus comprising a delivery member, a taking-up member, an apertured gate means for feeding a film from said delivery member through said gate past the aperture thereof toward said taking-up member, a shutter for cooperating with the film at the aperture of said gate, a source of power, a clutch for operatively connecting said delivery member and said source of power whereby the film which has been fed therefrom by said feeding means is rewound upon said delivery member, a clutch for operatively disconnecting said shutter and said source of power, and sequential control mechanism interlocking said clutches and effective for rendering them alternatively operative whereby said shutter is maintained inoperative during the rewinding of the film upon said delivery spindle.

47. In a film handling apparatus, a shutter, a plurality of film holding members, driving means for said shutter and for said film holding members, a clutch for operatively connecting and disconnecting said shutter and said means, a clutch for operatively connecting and disconnecting each of said members and said means, each of said clutches including a driving element and a driven element one of which is movable into operative relation with the other whereby said clutch is operated, and control means, said control means including a bodily movable actuating member and mechanism connecting said actuating member and the movable members of all of said clutches whereby upon the movement of said actuating member each of said clutches is operated.

48. In a film handling apparatus, film moving mechanism, driving means for said mechanism, a clutch for operatively connecting and disconnecting said mechanism and said driving means, said clutch including a driving member, a driven member and power-absorbing means operatively positioned between said members, a take-up spindle, driving means for said spindle, a clutch for operatively connecting and disconnecting said spindle and said driving means therefor, said last mentioned clutch including a driving member and a driven member, one of which is movable into operative relation with the other to operate said clutch and a single control means for both of said clutches, said control means including an actuating member and a link connecting said actuating member and said movable member of said first mentioned clutch and a link connecting said actuating member and said movable member of said second mentioned clutch and effective upon a first movement of said actuating member for moving each of said movable members into operative and hence driving relation with the other member of each of said clutches respectively, whereby each of such clutches is rendered operative, and effective upon a second movement of said actuating member for moving each of said movable members out of such operative relation with the other of said driving members respectively and hence effective for rendering said clutches inoperative.

49. In a film handling apparatus, two film moving means for feeding the same film at the same time, a source of power for driving both of said means, connective mechanism between said source of power and each of said film moving means, said connective mechanism between said source of power and one of said film moving means including a driving member, a driven member, and a spring connected therebetween whereby said spring takes up a predetermined portion of the movement of said driving member before movement is transmitted to said driven member and hence to said last above mentioned film moving means, and connective mechanism between said source of power and the other of said film moving means.

50. In a film handling apparatus, a film moving means, a film supporting spindle, a source of power for said means and said spindle, connective mechanism between said means and said source of power, said connective mechanism including a driving member, a driven member, and a spring connected therebetween whereby said spring takes up a predetermined portion of the movement of said driving member before movement is transmitted to said driven member and hence to said film moving means, and connective mechanism between said spindle and said source of power.

51. In a film handling apparatus, film moving means, a film supporting spindle, a source of power for said means and said spindle, operable connective mechanism between said means and said source of power, said connective mechanism including a driving member, a driven member, and a spring connected therebetween whereby said spring takes up a predetermined portion of the movement of said driving member before movement is communicated to said driven member and hence to said film moving means, operable connective mechanism between said spindle and said source of power, and means interconnecting said connective mechanisms for operating both of the same.

52. In a film handling apparatus, a film supporting spindle, a clutch therefor, and control mechanism for said clutch, said control mechanism comprising a rotatable member effective to actuate said clutch, a lever adapted to rotate said member, and a second lever movable into and out of operative connection with said first mentioned lever and adapted when in such operative connection for movement effective to actuate said first mentioned lever to rotate said member.

53. In a film handling apparatus, a film supporting spindle, a clutch therefor, and control mechanism therefor, said control mechanism comprising a rotatable member effective to actuate said clutch, a lever adapted to rotate said member, and a second lever mounted upon and rotatable with a third lever and slidable relative thereto, the rotation of said third lever being effective to bring said second lever into operative connection with said first lever and the sliding of said second lever being effective to move said first lever so that it rotates said member.

54. In a film handling apparatus, film feeding means, a clutch therefor, and control mechanism for said clutch, said control mechanism comprising a rotatable member effective to actuate said clutch, a lever adapted to rotate said member and a second lever movable into and out of operative connection with said first mentioned lever and adapted, when in said operative connection, to actuate said first mentioned lever to rotate said member.

55. In a film handling apparatus, film feeding means, a clutch therefor, and control mechanism for said clutch, said control mechanism comprising a rotatable member effective to actuate said clutch, a lever adapted to rotate said member, and a second lever mounted upon and rotatable with a third lever and slidable relative thereto, the rotation of said third lever being effective to bring said second lever into operative connection with said first lever and the sliding of said second lever being effective to move said first lever so that it rotates said member.

56. In a film handling apparatus, a light source, an apertured film gate, a heat shield, and mechanism adapted to move said heat shield into and out of position in the path of light between said source and said aperture, said mechanism comprising a rotatable member upon which said shield is mounted, a lever adapted to rotate said member, and a second lever movable into and out of operative connection with said first mentioned lever and adapted, when in such operative connection, for actuating said first mentioned lever to rotate said member.

57. A motion picture apparatus which comprises an openable apertured gate through which a film passes, a light source cooperating with said aperture, operable means to diminish the heat from said light source upon said aperture, and control mechanism for said means comprising a primary pivoted lever capable of rotational movement, a secondary sliding lever mounted thereon capable of rotational movement therewith to a plurality of positions and of sliding movement independently thereof to a plurality of positions, and connections between said lever and said operable means for operating said means upon said sliding movement of said secondary lever, when said primary lever is in one of said positions, and means disconnecting said levers and said operable means upon said rotational movement when said secondary lever is in another of said positions.

58. Film handling apparatus comprising a light source, an apertured film gate, a heat shield therebetween, means to move a film through said gate in a feeding direction, a clutch to actuate said feeding means, and control mechanism for said heat shield and said clutch, said mechanism comprising a rotatable member adapted to move said heat shield into the path of light between said light source and the aperture of said gate, means comprising a pivoted lever to rotate said member, a second rotatable member adapted to render said clutch inoperative upon said feeding means, a lever adapted to rotate said last mentioned member, and connecting means between said levers whereby said levers move at the same time.

59. Apparatus according to claim 58, said control mechanism including a third lever movable into and out of operative connection with said second mentioned lever and adapted when in such operative connection therewith to move said second mentioned lever for rotating said second mentioned member and moving said pivoted lever so that said pivoted lever rotates said first mentioned member.

60. Apparatus according to claim 58, said control mechanism including a third lever movable into and out of operative connection with said second mentioned lever and adapted when in such operative connection therewith to move said second mentioned lever for rotating said second mentioned member and moving said pivoted lever so that said pivoted lever rotates said first mentioned member, said third lever being mounted upon and rotatable with a fourth lever and slidable relative thereto, the rotation of said fourth lever being effective to bring said third lever into operative relation with said second lever and the sliding of said third lever relative to said fourth lever being effective to move said second lever so that it rotates with said second mentioned member and moves said pivoted lever.

61. Film feeding apparatus comprising means for feeding a film from a delivery to a take-up spindle, means effective during the period of said film movement for controlling the tension upon that portion of said film which extends between said spindles, and mechanism controlling the bringing of said tension controlling means into operative engagement with said film, said mechanism comprising a rotatable member connected to said tension means whereby the rotation of said member controls engagement of said tension means with said film, and means to rotate said member.

62. Apparatus according to claim 61, said last mentioned means including a lever adapted to rotate said member, and a second lever rotatable with and slidable independently of said first mentioned lever and, when so rotated, actuating said first mentioned lever to rotate said member.

63. Film feeding apparatus comprising an intermittent feeding member, a take-up spindle, means positioned therebetween for controlling the rate of rotation of said take up spindle while a film is being fed from said feeding member to said take-up spindle, and mechanism for bringing said means into operative relation to said film, said mechanism comprising a member capable of rotational movement operating a pivoted member which in turn operates a member having aproximately longitudinal movement which operates said means, and means to rotate said rotational member.

64. Film feeding apparatus comprising a delivery spindle, an intermittent feeding member, means positioned therebetween for controlling the rate of rotation of said delivery spindle while a film is being drawn from said spindle to said intermittent feeding member, and mechanism for controlling the operative engagement of said means with said film, said mechanism comprising a member capable of rotational movement operating a pivoted member which in turn operates a member having approximately longitudinal movement which operates said means, and means to rotate said rotational member.

65. Film feeding apparatus comprising a film supporting spindle, an intermittent feeding member, means positioned therebetween for controlling the rate of rotation of said film supporting spindle while a film is being drawn between said spindle and said intermittent feeding member, and mechanism for controlling the operative engagement of said means with said film, said rotation controlling means comprising a guide over which said film passes, a support for said guide, a braking shoe adapted to cooperate with said spindle, connecting means between said shoe and said support, and operative connection between said support and said mechanism.

66. In a film feeding apparatus, an openable gate, means for opening or closing said gate, a member for feeding a film therethrough, means for rendering said member operative, and mechanism connected to and controlling both of said means, said mechanism comprising a lever restricted to rotation and a second lever mounted thereon for rotational movement therewith and sliding movement independently thereof, and connections between said levers and each of said means, said connections being effective to operate one of said means upon said rotational movement of said levers and being effective to operate the other of said means upon such sliding movement of said levers.

67. In a film handling apparatus, a delivery member, a take-up member, a gate positioned therebetween, a member for feeding a film from said delivery member toward said take-up member, means for driving said feeding member, mechanism for controlling the tension of the film between said delivery member and the gate and between said gate and said take-up member, means for rendering said tension mechanism effective and ineffective upon the film, and mechanism for controlling both of said previously mentioned means, said mechanism including a lever restricted to rotation and a second lever mounted thereon for rotational movement therewith and sliding movement independently thereof, and connections between said levers and each of said means for rendering one of said means operative upon such rotational movement of said levers and for rendering the other of said means operative upon said sliding movement of said levers.

68. In a film handling apparatus, an openable gate, a take-up member, and a rewinding member, and mechanism for controlling said gate and said members, said mechanism including a primary rotatable lever, a second lever mounted thereon and rotatable therewith and slidable independently thereof, and connections between said levers and said gate and each of said members, said connections between said second lever and said gate being effective to open the gate of said apparatus upon such rotational movement of said second lever and said connections between said second lever and said members being effective upon said sliding movement of said second lever when said first lever is in one position for controlling the operation of the take-up member and when said primary lever is in another position for controlling the operation of the rewinding members.

69. Film handling apparatus comprising a rewinding member, a rewinding member clutch, a take-up member, a take-up member clutch, and control mechanism, said control mechanism comprising a lever capable of rotational movement, a second lever mounted thereon and rotatable therewith and slidable independently thereof, and connections between said second lever and said take-up member clutch for actuating said take-up member clutch upon the sliding movement of said second lever, when said first mentioned lever is rotated to one position, and for actuating said rewinding member clutch upon sliding movement of said second lever, when said first mentioned lever is rotated to another position.

70. Motion picture apparatus comprising a rewinding member, a rewinding member clutch, feeding means, a clutch therefor, a take up member and a clutch therefor, and control mechanism, said control mechanism comprising a lever rotatable to a plurality of positions, a second lever mounted thereon and rotatable therewith and slidable independently thereof, and connections between said second lever and said clutches for actuating said take-up member clutch and said clutch for said feeding means upon the sliding movement of said second mentioned lever, when said first mentioned lever is in one position and for actuating said rewinding member clutch upon the sliding movement of said second lever, when said first mentioned lever is in another position.

71. In a motion picture apparatus, a spindle from which a film may be unrolled to project or expose the same and upon which said film may be rewound, a spindle upon which said film may be wound while being projected or exposed and from which said film may thereafter be unrolled while said film is being rewound upon said first mentioned spindle, clutches adapted for successively actuating each of said spindles, said clutch for one of said spindles being operated by a shaft which extends through a tube which actuates the other mentioned clutch, and means for rotating said shaft and said tube independently of each other.

72. Film handling apparatus including an openable gate and mechanism effective to open said gate, said mechanism comprising a first member which is rotatable, a second member which is longitudinally movable, means connecting said first and second members, and means to rotate said first member, whereby the rotation of said first member causes the longitudinal movement of the second member, said means to rotate said first member including a first lever connected to said first member, a second lever, and connecting means between said levers whereby the rotation of said second lever rotates said first lever and the longitudinal movement of said second lever is ineffective upon said first lever.

73. Film handling apparatus comprising means to feed a film, means bodily to remove a film from said feeding means, and control mechanism for said film removing means, said control mechanism comprising a first member which is rotatable, a second member which is longitudinally movable, connecting means between said first and second members, and means to rotate said first member, whereby the rotation of said first member causes the longitudinal movement of said second member, said means to rotate said first member comprising a first lever connected to said first member, a second lever, and connecting means between said levers whereby the rotation of said second lever rotates said first lever and the longitudinal movement of said second lever is ineffective upon said first lever.

74. In a motion picture apparatus, a perpendicular main frame, two spindles supported thereby at right angles thereto adapted to support a film, means to feed said film from one of said spindles to another, said means being disposed upon the same side of said frame as said spindles, an operating shaft for said feeding means positioned upon the opposite side of said frame from said feeding means and supported by said main frame in spaced parallelism thereto, a motor disposed upon the same side of said main frame as said operating shaft, a power shaft parallel to the axis of said motor and connected therewith and in spaced parallelism to said operating shaft, means including a clutch to drive said operating shaft from said power shaft, worm gearing upon said power shaft enmeshing with gearing upon a spur shaft substantially parallel with one of said spindles, means connecting said spur shaft with said spindle, a spur shaft substantially parallel with the other of said spindles, means connecting said last previously mentioned spur shaft with said last previously mentioned spindle, and means to drive said last mentioned spur shaft from said first mentioned spur shaft, said means being alternatively operable.

75. In a motion picture apparatus, a bottom plate, a main frame perpendicular thereto, two spindles supported by said frame at right angles thereto adapted to support a film, means to feed said film from one of said spindles to another, said means being disposed upon the same side of said frame as said spindles, an operating shaft for said feeding means positioned upon the opposite side of said frame from said feeding means and supported from said main frame in spaced parallelism thereto, a motor disposed upon the same side of said main frame as said driving shaft, a power shaft substantially in line with the axis of said motor and in spaced parallelism to said operating shaft, means including a clutch to drive said operating shaft from said power shaft, worm gearing upon said power shaft enmeshing with gearing upon a spur shaft substantially parallel with one of said spindles, means operatively to connect said spur shaft with said spindle, a spur shaft substantially parallel with the other of said spindles, means operatively to connect said spur shaft with said spindle, and means to drive said last mentioned spur shaft from said first mentioned spur shaft, said two spur shafts being continuously operable irrespective of the position of said clutch.

76. Apparatus for the feeding of strip material, comprising spaced rotatable carriers, an openable gate between the carriers, means for feeding the material through the gate from one carrier to another, braking means for one of said carriers, said braking means comprising a member to contact with said carrier, a film-engaging member between the gate and the carrier, and a connection between said film-engaging member and said contacting member whereby the movement of said film-engaging member operates said contacting member, and a guide adjacent the gate and film-engaging member for directing the film into the open gate and over the film-engaging member.

77. Apparatus for the feeding of strip material, comprising spaced rotatable carriers, means for feeding the material from one of said carriers to another, braking means for one of said carriers, said braking means comprising a member to contact with said carrier, a film-engaging member between the feeding means and the carrier, and a connection between said film-engaging member and said contacting member whereby the movement of said film-engaging member operates said contacting member, and a guide adjacent the feeding means and film-engaging member for directing the film into operative relation with the feeding means and the film-engaging member.

78. Film feeding apparatus, comprising a delivery reel, a take-up reel, feeding mechanism intermediate said reels for feeding a film from one of said reels toward the other, means controlled by the tension on the film for varying the rate of feeding of film by said delivery reel, a film-engaging member embodied in said tension means and positioned between said delivery reel and said film feeding mechanism, and guiding means cooperative with said film engaging member and said film feeding mechanism for guiding a film into operative position relative to both of the same during the initial positioning of the film in the apparatus.

79. Film feeding apparatus, comprising a delivery reel, a take-up reel, feeding mechanism intermediate said reels for feeding a film from one of said reels toward the other, means controlled by the tension on the film for varying the rate of rotation of said take-up reel, a film-engaging member embodied in said tension means and positioned between said take-up reel and said film feeding mechanism, and guiding means cooperating with said film engaging member and said film feeding mechanism for guiding a film into operative position relative to both of the same during the initial positioning of the film in the apparatus.

80. Film feeding apparatus which comprises spaced rotatable carriers, an openable sectional gate between the carriers, means for feeding a film through said gate, from one of said carriers to another, braking mechanism for one of said carriers, said braking means comprising a member to contact with said carrier, a film engaging member between the gate and the carrier, and a connection between said film-engaging member and said contacting member whereby the movement of said film-engaging member operates said contacting member, and guiding means carried by and cooperating with said sectional gate for facilitating the initial operative positioning of the film relative thereto and to said film-engaging member.

81. Film feeding apparatus comprising spaced rotatable carriers, an openable sectional gate between the carriers, means for feeding a film through the gate from one of said carriers to another, means controlled by the tension of the film for varying the rate of rotation of one of said carriers, a film-engaging member embodied in said tension means and positioned between said gate and said carrier, and guiding means carried by said gate and cooperating therewith for facilitating the initial operative positioning of the film relative thereto and to said film-engaging member.

82. Film handling apparatus including a film supporting member, a gate, said gate including a fixed section and a section movable relatively thereto to a position wherein space is afforded for the lateral insertion of a film between said sections, means for feeding a film positioned within said gate and supported by said member, means for controlling the tension of that portion of the film which extends between said supporting member and said gate, and film guiding means disposed in cooperative position relative to one of said sections of said gate, when said section is disposed in spaced relation to said other section, to said feeding means, and to said tension controlling means for cooperating with each of the same for guiding the film into position following lateral movement thereof relative to the normal direction of travel of the film between said gate and said supporting member.

83. Film handling apparatus including a film supporting member, a gate, said gate including a fixed section and a section movable relatively thereto to a position wherein space is afforded for the lateral insertion of a film between said sections, means for feeding a film positioned within said gate and supported by said member, means for controlling the tension of that portion of the film which extends between said supporting member and said gate, separate film guiding means disposed in cooperative position relative to each of said sections of said gate, when they are disposed in spaced relation to each other, to said feeding means, and to said tension control means for cooperating with each of the same for guiding the film into position following lateral movement thereof relative to normal direction of travel of the film between said gate and said supporting member.

84. Film handling apparatus including a film supporting member, an openable gate, means for feeding a film between said gate and said member, film guiding means positioned adjacent said gate and said feeding means for directing a film into position by lateral movement thereof relative to the normal direction of travel of said film through said gate, means for controlling the tension of that portion of the film between said supporting member and said gate, said tension controlling means including a movable member engaging the film between said supporting member and said gate, and means for moving said film-engaging member into inoperative tension-controlling position and into film-guiding relation with said film guiding means.

85. Film handling apparatus including a film-supporting member, a gate, means for feeding a film between said gate and said member, film guiding means positioned adjacent said gate for directing a film into position by lateral movement thereof relative to the normal direction of travel of a film through said gate, means for controlling the tension of that portion of the film between said supporting member and said gate, said tension-controlling means including a member engaging the film between said supporting member and said gate, and means for moving said film-engaging member into inoperative tension-controlling position and into film-guiding relation with said film-guiding means.

86. In a motion picture apparatus, a main frame, spaced supports positioned upon one side thereof to support a film while the same is fed, an openable gate through which said film travels disposed between said supports, mechanism for controlling the tension of the portion of said film extending between at least one of said supports and said gate, said mechanism including means adapted to form operative engagement with said film, said means being disposed upon the same side of said frame as said film supports, and supporting means for said film-engaging means extending to the opposite side of said frame and being attached to said opposite side and being capable of movement relative to said frame, and guiding means effective when said gate is open to cooperate with said gate, with said film supports, and said tension-controlling mechanism to guide said film into operative relation with said gate and said mechanism.

87. In a motion picture apparatus, a main frame, two rotatable film-supporting members, an openable gate disposed between said film-supporting members through which the film travels, mechanism for controlling the tension of those sections of the film which extend between each of said supporting members and the gate, said mechanism including a member engaging each of such sections of the film, said film-supporting members, said film-engaging members, and said gate being positioned upon the same side of said frame, a support for each of said film-engaging members extending to the opposite side of said frame and being attached to said frame for bodily movement relatively thereto, a braking element cooperating with each of said film-supporting members for controlling the rotation thereof, and a connection between each of said braking elements and one of said film-engaging members whereby the movement of said film-engaging member operates the braking element attached thereto, and guiding means positioned upon said frame in cooperative position relatively to said gate, to said film-supporting members and to said film-engaging members for guiding the film into operative relation with said gate and said film-engaging member when said gate is closed.

88. In a film handling apparatus, a film supporting member and a gate between which a film extends, a frame from one side of which said member and gate laterally extend in the same direction, said frame being provided with an opening, a member engaging the film between said film-supporting member and said gate for controlling the tension of that section of the film between said member and gate, said film-engaging member being disposed upon the same side of said frame as that from which said other-mentioned members extend, a support for said film-engaging member extending therefrom through said opening in said frame to the opposite side thereof, a pivotal mounting for said support upon such last-mentioned side of said frame, a tension spring extending between said support and said frame, and guiding means effective when said gate is open to cooperate with said gate, said film supporting member, and said film-engaging member to guide the film into operative relation with said gate and said film-engaging member.

89. In a motion picture apparatus, a main frame upon one side of which are disposed film-supporting means and an openable gate through which a film supported by said supporting means passes, operating means for opening and closing said gate, mechanism for controlling the tension in the portion of the film extending between said supporting means and said gate, said mechanism including means in operative engagement with the film disposed upon the same side of said frame as said film-supporting means and movable between an inoperative and an operative position, a support for said film-engaging means extending to the opposite side of said frame from that upon which said film-supporting means is disposed and being mounted upon said frame for movement relatively thereto, a movable actuating member, connections passing from said actuating member to such last-mentioned side of said frame and attached to said support for moving the same and hence moving said film-engaging means from one of such positions to the other upon the movement of said actuating member, and connections between said actuating member and said gate-operating means for actuating the same upon such movement of said actuating member.

90. In a film handling apparatus, film supports, means for feeding a film from one of said supports toward the other, operable means for positioning the film upon said film feeding means, tension means movable into operative engagement with said film, means for maintaining said tension means in engagement with the film for producing a predetermined tension upon that portion of said film between said supports, and control mechanism interlocking said positioning means and said tension means.

91. In a film handling apparatus, a plurality of film supporting members between which a film extends, a gate, disposed between said members, through which the film passes, said gate comprising a fixed section and a section movable relatively thereto, means engaging the film for controlling the tension of those sections of the film between said gate and each of said film supporting members, and means interlocking said movable section and said tension controlling means and effective for moving said movable section away from said fixed section and for moving said tension control means to inoperative position in timed relation to such movement of said gate section.

92. In a film handling apparatus, in combination an openable film receiving gate, means for controlling the tension of a film throughout its entire operative length, means for simultaneously opening said gate and moving said tensioning means to inoperative position, and film guiding means cooperating with said gate and with said tensioning means when the latter is in inoperative position.

93. In a film handling apparatus, in combination a guide, film feeding means cooperating therewith, mechanism effective on opposite sides of said feeding means for controlling as desired the tension of the entire unwound length of a film fed by said feeding means, and means for moving said mechanism into cooperative relation with said guide to facilitate film threading.

94. In a film handling apparatus, two film supporting members between which a film extends, an openable gate positioned between said members through which the film supported thereby passes, means for producing a predetermined condition of tension throughout the portions of the film between said gate and each of said supporting members, said means comprising a film engaging member disposed between said gate and each of said supports and movable to a first position wherein it defines one side of a relatively long path between said supports and said gate and to a second position wherein it defines one side of a relatively short path therebetween, and means interlocking said gate and said film engaging members and effective for opening said gate and moving said film engaging members from said first to such second position.

95. In a film handling apparatus, two film supporting members between which a film passes, an openable gate disposed between said film supporting members through which the film is fed, yieldable means in engagement with the film while said gate is closed for producing and maintaining a predetermined condition of tension throughout the portion of the film between said members, and means for closing said gate and moving said tension producing and maintaining means into operative relation with the film.

96. In a film handling apparatus, a delivery spindle and a take-up spindle between which a film extends, an openable gate disposed between said spindles through which the film passes, means for controlling the tension of the portion of said film which extends between said spindles, and means for closing said gate and moving said tension controlling means into operative relation with the film, means for maintaining said tension controlling means in said relation while said gate is closed, and means for opening the gate and moving said tension controlling means out of operative relation with the film.

97. In a film handling apparatus, a film supporting member and a gate between which a film extends, resilient means having a film guiding surface and bodily movable to a first position wherein it engages the film between said supporting member and said gate and thereby subjects the section of the film extending between said member and said gate to tension and to a second film guiding position wherein it is free of engagement with the film, and control mechanism, said control mechanism comprising a movable actuating member, two stations to which said actuating member is bodily movable, and connections between said actuating member and said resilient means for moving said resilient means to one of said positions upon the movement of said actuating member to one of said stations and for moving said resilient means to the other of said positions upon the movement of said actuating member to the other of said stations.

98. In a film handling apparatus, delivery means and take-up means between which a film extends, an openable gate disposed between said means through which the film passes, means including a film-guiding surface for controlling the tension of that portion of the film which extends between said gate and at least one of said means, said tension control means being movable into a tension-controlling position and a guiding position, and means interconnecting said tension control means and said gate for opening said gate and moving said tension control means into said guiding position.

99. In a film handling apparatus, a delivery spindle and a take-up spindle between which a film extends, an openable gate disposed between said spindles through which the film passes, means including a film-guiding surface for controlling the tension of that portion of the film which extends between said gate and at least one of said spindles, said tension-control means being movable into a film guiding position and a tension controlling position, means for moving said tension-control means into such guiding position, means for opening said gate, and a single means for operating the gate opening means and the tension-control moving means.

100. In a film handling apparatus, an openable gate through which a film is fed, a support for the film, means for guiding and controlling the tension of that section of the film extending between said support and said gate, said guiding and tension-controlling means including a film-engaging member movable from one position adjacent said gate wherein while said gate is open it forms one side of a path in which the film is initially positioned to another position wherein it forms one side of the path through which the film is fed while said gate is closed, means for opening said gate, and means for moving said film-engaging member from one of said positions to the other.

101. In a film-handling apparatus, an openable gate through which a film is fed, a support for the film, means for guiding and controlling the tension of that section of the film extending between said support and said gate, said guiding and tension-controlling means including a film-engaging member movable from one position adjacent said gate wherein while said gate is open it forms one side of a path in which the film is initially positioned to another position wherein it forms one side of the path through which the film is fed while said gate is closed, and means interconnecting said gate and said film-engaging member for opening said gate and for moving said film-engaging member from one of such positions to the other.

102. In a film handling apparatus, an openable gate through which a film is fed, said gate including a fixed section and a section movable relatively thereto, a support for the film, a member engaging the film between said gate and said support and movable from a first position adjacent one of said sections of said gate wherein while said sections of the gate are in relatively remote relation to each other it forms one side of a path in which the film is initially positioned to a second position wherein it forms one side of a path through which the film is fed while said gate is closed, and control means interconnecting said movable gate section and said film-engaging member for moving said film-engaging member from such first to such second position and said movable gate section from remote relation to said fixed section to relatively adjacent relation whereby said gate is closed.

103. In a film handling apparatus, two supports for a film, an openable gate disposed between said supports through which the film is fed, said gate including a fixed section and a section movable relatively thereto from a first position relatively remote from said fixed section wherein said gate is open to a second position relatively adjacent thereto wherein said gate is closed, a member engaging the film between each of said supports and said gate respectively, each of said members being movable to a position adjacent one of said sections of said gate wherein while said movable section is disposed in such first position and said gate is open said member forms one side of the path in which the film is initially positioned, and control means interconnecting said movable gate section and both of said film-engaging members for moving said gate section to such first position and said film-engaging members to such above described position and for moving said gate section from such first to such second position and said film-engaging members away from such above described position.

104. In a film handling apparatus, film carrying means, film feeding means, operable means for the bodily removal of a film from said feeding means, an openable gate through which the film travels, tension control means for the film, and means effective for opening said gate, actuating the means for removing the film from said feeding means and moving said tension control means to inoperative position.

105. In a film handling apparatus, film carrying means, toothed film-feeding means, an openable gate through which a film travels, means for shielding the film from the teeth of said feeding means, means for controlling the tension of that part of said film extending between said gate and said film carrying means, and control means interconnecting said shielding means and said tension control means and effective for actuating said film shielding means and moving said tension control means to inoperative position.

106. In a film handling apparatus, a container for a film, which container embodies means for guiding said film, means for supporting said container upon said apparatus, means in engagement with said film to feed said film from said container, an openable gate through which said film is fed, means to control the tension of the entire portion of said film which extends without said container, means for removing said film from engagement with said feeding means, and control means interconnecting said previously mentioned means and said gate and effective to render said feeding means and said tension controlling means inoperative and to render said means for removing said film from said feeding means effective and to open said gate.

107. In a film handling apparatus, two film supports, means for intermittently feeding a film from one of said supports toward the other, said means including a toothed member positioned between said carriers and adapted to engage the film, means for separating the film and said toothed member whereby said toothed member and the film are maintained free of engagement, means engaging the film between said intermittent toothed member and each of said supports and movable between one position wherein they define one side of a relatively short path between said supports and another position wherein they define one side of a relatively long path between said supports, means for moving said film-engaging path defining means from one of such positions to the other, and control mechanism interconnecting said moving means and said means for separating the film and said intermittent feeding member and effective to operate both of the same.

108. In a film handling apparatus, an idling delivery carrier, a continuously driven take-up carrier, means for intermittently feeding the film from said delivery carrier toward said take-up carrier, said means including a toothed member adapted to engage the film between said carriers, means for initially increasing the length of the films extending between said carriers whereby a sufficient amount of film is initially provided between said carriers to allow for the compensation necessary because of the difference of the character of movement of said carriers and said intermittent feeding members during the operation of the same, and operable means for preventing engagement of the film and the teeth of said feeding member.

109. In a film handling apparatus, an idling delivery carrier, a continuously driven take-up carrier, operable means for intermittently feeding the film from said delivery carrier toward said take-up carrier, said means including a member positioned between said carriers and adapted to engage the film, means for initially increasing the length of film extending between said carriers whereby compensation for the difference in character of movement of said carriers and said intermittent member may be secured, and sequential control mechanism interconnecting said compensating means and said intermittent feeding means and effective for first rendering said compensating means operative and thereafter rendering said intermittent feeding means operative upon the film.

110. In a film handling apparatus, means to place a film under a condition of tension throughout its entire unwound length, film feeding means and means to position said film thereon, means to remove said film from said feeding means and means to release the tension thereon in order to facilitate rewinding said film, and unitary means for operating said last two mentioned means.

111. In a film handling apparatus, two film supporting members between which a film extends, means for feeding a film from one of said members to the other, means for positioning the film upon said feeding means, means for producing a predetermined condition of tension in that section of the film between said members, means for feeding the film from said second mentioned member toward said first mentioned member, and control mechanism interlocking said previously mentioned means and selectively effective for rendering said positioning means, said feeding means, and said tensioning means operative, or for rendering said rewinding means operative, and said tensioning means and said feeding means inoperative.

112. In a film handling apparatus, means for feeding a film, means coacting with said feeding means to control the tension of said film during the feeding thereof, and means for reversing the direction of movement of said film, said last mentioned means including means for rendering said film feeding means and film tensioning means inoperative during the travel of the film in reverse direction.

113. In a film handling apparatus, means successively operable for moving a film intermittently in one direction for projection and continuously in the opposite direction for rewinding, means for controlling the tension of the film, and mechanism interlocking said film moving means and said tension controlling means for rendering said tension controlling means operative while the film is being moved in such projecting direction and inoperative while the film is being moved in such rewinding direction.

114. In a film handling apparatus, mechanism from which a film can be unrolled while said film is being fed and upon which said film can thereafter be rewound, means for feeding said film intermittently, mechanism upon which said film can be wound after it has been fed and from which it can thereafter be unrolled while said film is being rewound, an openable gate disposed between said mechanisms through which said film passes, means for closing the gate, means to bring said film into operative engagement with said intermittently feeding means, means bodily to remove said film from said intermittently feeding means, means for compensating for the differences in character of movement of said mechanisms and said feeding means, and sequential control means interlocking all of the previously mentioned means for operating said means for closing said gate and said means for bringing the film into operative relation with said feeding means and initiating the operation of said feeding means for passing said film from said first mentioned mechanism to said second mentioned mechanism, and for bringing said compensating means into operative relationship with said film and thereafter for rendering inoperative said feeding means and said compensating means and for opening said gate and for actuating said means for the bodily removal of said film from said feeding means and for initiating the operation of said first mentioned mechanism for rewinding said film thereon from said second mentioned mechanism.

115. In a film handling apparatus, two supports for a film, means for feeding said film intermittently from one support to the other to project the same, means for compensating for the differences in character of movement of said supports and said intermittently feeding means, means to move said film in the opposite direction between said supports to rewind the same, and a single control means, interlocking said previously included means, which can be operated to successive stations so that said feeding and compensating means are rendered operative and so that said feeding or compensating means are rendered inoperative and said rewinding means operative.

116. In a film handling apparatus, mechanism from which a film may be unrolled while said film is being projected and upon which said film may thereafter be rewound, means for feeding said film intermittently to project the same, mechanism upon which said film may be wound as it is being projected and from which it may be thereafter unrolled while said film is being rewound, means for compensating for the differences in character of movement of said mechanism and said feeding means during the projecting cycle, and control means interlocking said previously mentioned means for actuating said feeding means and said compensating means during passage of said film from said first to said second mechanism, and thereafter for rendering inoperative said feeding and compensating means during passage of said film from said second mechanism to said first mentioned mechanism.

117. In a film handling apparatus, mechanism from which a film can be unrolled while said film is being projected or exposed and upon which said film can thereafter be rewound, means for feeding said film intermittently to project or expose the same, mechanism upon which said film can be wound after it has been projected or exposed and from which it can thereafter be unrolled while said film is being rewound, an openable gate disposed between said mechanisms through which gate said film passes, means to bring said film into operative engagement with said intermittently feeding means, means bodily to remove said film from said intermittently feeding means, means for compensating for the differences in character of movement of said mechanisms and said feeding means, and a single control means necessarily operative to close said gate and to actuate said means for bringing said film into operative relation with said feeding means and to initiate the operation of said feeding means to pass said film from said first mentioned mechanism to said second mentioned mechanism, and to bring said compensating means into operative relation with said film, and thereafter to render inoperative said feeding means and said compensating means and to open said gate and to actuate said means for the bodily removal of said film from said feeding means and to initiate the operation of said first mentioned mechanism to rewind said film thereon from said second mentioned mechanism.

118. In a film handling apparatus, a delivery reel and a take-up reel between which a film extends, an operable intermittently moving feeding mechanism disposed between said reels, an openable gate through which said film passes disposed between said reels, operable means to move said film into operative engagement with said feeding mechanism, operable means to compensate for the differences in character of movement of said reels and said feeding mechanism, and a single control means operatively connecting said feeding mechanism, said gate, said film moving means, and said compensating means effective to actuate said means to bring said film into operative relation with said feeding mechanism and to close said gate and to initiate operation of said compensating means and said feeding mechanism.

119. In a film handling apparatus, a non-driven delivery reel and a power driven take-up reel between which a film extends, an operable intermittently moving feeding means disposed between said reels, operable means for compensating for the differences in character of movement of said reels and said feeding means, operable means to move said film into operative engagement with said intermittently moving means, and a single control means operatively connecting said film feeding means, said film-moving means, and said compensating means effective to initiate operation of said feeding means and said compensating means and to actuate said means to bring said film into engagement with said feeding means.

120. In a film handling apparatus, two continuously moving film supporting members between which a film extends, an operable intermittently moving feeding means disposed between said members, an openable gate disposed between said members through which said film passes, operable compensating means for initially increasing the length of film between said members for compensating for the differences in character of movement of said members and said feeding means, and a single control means interconnecting said feeding and compensating means and said gate and effective to initiate operation of said feeding means and said compensating means and to close said gate.

121. A film handling apparatus, comprising two continuously moving film supporting members between which a film extends, an operable intermittently moving feeding means in engagement with said film disposed between said members, operable means for initially increasing the length of the film between said members for compensating for the differences in character of movement of said members and said feeding means, and a single control means interconnecting said feeding means and said compensating means for initiating operation of said feeding means and said compensating means.

122. A film feeding apparatus comprising a non-driven delivery reel, a power-driven take-up reel, an intermittently moving feeding member disposed between said reels, means for actuating said feeding member, operable means to compensate for the differences in character of movement of said reels and said feeding means, means for rendering said compensating means operative upon the film, and control means interconnecting said means for actuating said feeding member and said means for rendering said compensating means operative upon the film.

123. In a motion picture apparatus, a continuously operating film-moving member and an intermittently operating film-moving member between which a film extends, a source of power, a member engaging the film between said film-moving members and movable to and from a position wherein it increases the length of the film extending between said film-moving members whereby compensation may be secured for the difference in character of movement of said film-moving members, a clutch for applying power from said source to at least one of said film moving members, said clutch including a driving and a driven element one of which is movable into operative relation with the other for rendering said clutch operative, and control mechanism interconnecting said film-engaging member and the movable element of said clutch for moving said film-engaging member and operating said clutch.

124. In a motion picture apparatus, a film-supporting member, a member for feeding a film supported by said supporting member, a source of power, means for applying power from said source to said film-feeding member for operating the same, a member engaging the film between said film-supporting member and said film-feeding member and movable from one position wherein it forms one side of a relatively short path for the film between said film-supporting member and said film-feeding member and another position wherein it forms one side of a relatively long path therebetween, and control mechanism for said power-applying means and said path-defining member, said control mechanism including a movable actuating member, and connections between said actuating member and said power-applying means for controlling said power-applying means and moving said path-defining member upon the movement of said actuating member.

125. In a film handling apparatus, taking-up means for a film, feeding means for said film, means for protecting said film from heat, means bodily to remove said film from said feeding means, an openable gate through which said film passes, means to rewind said film, and control means which when moved to a first station initiate the operation of said taking-up and feeding means and render said heat protective means ineffective and when moved therefrom to a second station render said feeding and taking-up means ineffective and said heat protective means effective, and when moved therefrom to a third station actuate said means to remove said film from said feeding means and open said gate and when moved to a fourth station initiate the operation of said rewinding means.

126. Apparatus according to claim 125, said control means having a single actuating member connected thereto for moving the same to said stations.

127. Apparatus according to claim 125, and means interconnecting said control means and said rewinding means at the fourth station for rendering the rewinding means inoperative when the control is moved therefrom.

128. In a film handling apparatus, feeding means for a film, taking-up means for said film, means for protecting said film from heat, means bodily to remove said film from said feeding means, an openable gate through which said film passes, means to rewind said film, means to place said film in operative engagement with said feeding means, and control means which when moved to a first position initiates the operation of said taking-up means and said feeding means and renders said heat protective means ineffective and when moved from said first position to a second position renders said taking-up and feeding means inoperative and said heat protective means effective and when moved from said second position to a third position opens said gate and actuates said means for bodily removing said film from said feeding means and when moved to a fourth position initiates the operation of said rewinding means and when moved from said fourth position to said third position renders said rewinding means inoperative and when moved from said third to said second position closes said gate and actuates said means to place said film in operative engagement with said feeding means.

129. Apparatus according to claim 128, said control means having a single actuating member connected thereto for moving the same to said positions.

130. Motion picture apparatus comprising a take-up spindle, a take-up spindle clutch, a rewinding spindle, a rewinding spindle clutch, means for operating each clutch, a first control station corresponding to an inoperative position for the take-up clutch, a second control station corresponding to an operative position for the take-up clutch, control means interconnecting said clutch operating means movable between said stations, movable means for reducing the light effective upon the film, means for connecting said light reducing means and said control means effective upon the movement of said control means to said first station, whereby said control means moves said light reducing means to operate the same in timed relation to the movement of said take-up spindle clutch to inoperative position.

131. Film handling apparatus, comprising a delivery reel, a take-up reel, means for moving a film from said delivery reel toward said take-up reel for the purpose of feeding the same, a light source for cooperation with the film during such feeding operation, means for moving the film from said take-up reel to said delivery reel for the purpose of rewinding the same, means effective for protecting said film against damage by the heat of said light source and a single control means interlocking both of said feeding means and said heat protective means and effective for rendering said heat protective means operative during the operation of said second mentioned film moving means without affecting the circuit of said light source.

132. In a film handling apparatus, two film-supporting members, means between said film-supporting members for feeding a film from one of said members toward the other, said feeding means including a toothed member adapted to engage the film, a light source illuminating the film while it is being moved from one of said supporting members toward the other, operable means for protecting the film from the heat of said light source for the purpose of safeguarding the film during the manipulation thereof previous or subsequent to such moving operation, movable means for shielding the film from the teeth of said member during such manipulation, and control mechanism interconnecting said heat-protective means and said shielding means for jointly operating both of the same.

133. In a film feeding apparatus, means for moving a film in one direction, means for moving the film in another direction, a light source for directing light onto said film, a screen movable into a first position in the path of light from said source to the film wherein it is effective for varying the intensity of light reaching the film from said light source, or into a second position out of such path of light, and control mechanism interlocking both of said film moving means and said screen and necessarily effective for maintaining said screen in such first position during the operation of one of said film moving means and in such second position during the operation of the other of said film moving means.

134. Film handling apparatus comprising a delivery carrier, a take-up carrier, means for feeding the film from said delivery carrier to said take-up carrier in a projecting direction, a source for passing light through the film during such travel in a projecting direction, means for applying power to said delivery carrier for causing the film to travel from said take-up carrier to said delivery carrier in a rewinding direction, a shield mounted for movement between a first position wherein it is disposed between the film and said light-source for protecting the film from damage from the heat of said light source and a second position wherein it is disposed outside of the path between said light-source and the film, means for moving said shield between said positions, and a connection between said shield-moving means and said means for applying power to said delivery spindle for operating said shield moving means in predetermined relation to the operation of said power-applying means.

135. In a film handling apparatus, a gate comprising a plurality of sections between which a film passes, one of which sections is movable relatively to another for the purpose of opening the gate, means for opening said gate, operable means insuring variation in the intensity of light reaching a film in said gate, and operating mechanism interlocking said movable section and said means, said mechanism including an actuating member arranged for movement to a first position at which it renders said light varying means operative and thereafter to a second position at which it moves said movable section of said gate away from said first section.

136. In a motion picture apparatus, an apertured openable gate, a light source, a heat shield movable from a first position wherein it is positioned outside of the path of light between said source and such aperture to a second position wherein it is positioned in such path, and control mechanism for said gate and said heat shield, said control mechanism including a plurality of stations, a movable actuating member, connections between said actuating member and said heat shield for moving said shield from such first position into such second light-intercepting position upon the movement of said actuating member from one of said stations to another, and connections between said actuating member and said gate for opening said gate upon the movement of said actuating member to another of said stations.

137. In a film handling apparatus, a gate comprising a plurality of sections, between which a film passes, one of which sections is movable relatively to another for the purpose of opening the gate so that a film may be threaded therein, a source for directing light onto the film in said gate, means for decreasing the light from said source reaching said film for the purpose of protecting said film from heat, and control mechanism interlocking said movable section and said light decreasing means and effective for moving said movable section away from said fixed section and for rendering said light decreasing means operative, whereby while the film is protected from heat a decreased amount of light is directed upon said gate for the purpose of assisting in a threading operation.

138. In a film handling apparatus, film feeding mechanism, a heat shield movable between an inoperative and operative position, a first means to move the heat shield, a second means movable to a first position wherein it operates said mechanism and to a second position wherein it maintains said mechanism inoperative, and operable mechanism for selectively moving said first and second means, and means for locking the first means for holding the heat shield stationary in one of its positions while the selective operable mechanism maintains said second means in its first position and for holding the heat shield stationary in the other of its positions while the selective operable mechanism maintains said second means in its second position.

139. In a film handling apparatus, an idling delivery carrier and a continuously driven take-up carrier between which a film extends, a member for intermittently feeding the film from said delivery carrier toward said take-up carrier, a light source cooperating with the film between said carriers, operable means for protecting the film from the heat of said light source, operable means for initially increasing the length of the film extending between said carriers whereby compensation may be secured for the difference in character of movement of said carriers and said intermittent feeding member, and control mechanism interconnecting both of said means and effective for operating the same in predetermined relation.

140. In a film handling apparatus, a film gate movable from an open position wherein an opening is provided into which the film may be initially introduced to a closed position wherein it defines a path through which the film may be fed, means for feeding the film through said path, a film-magazine containing and protecting both the delivery and take-up coils of the film and having means for supporting the section of film extending between said coils, supports for said magazine so positioned upon said apparatus in relation to said opening that as the magazine is seated upon the supports the section of film between the coils supported by the magazine is disposable within the opening of the gate while the gate is open, said magazine being readily mountable upon said supports and removable therefrom, and a resilient film-tensioning means having film-guiding surfaces contacting with the film between said gate and at least one of said coils whereby that section of the film between said gate and said coil is guided during the feeding of the film through said gate while said gate is closed and whereby the tension of said last mentioned section of the film is controlled.

141. In a film handling apparatus, a film gate movable from an open position wherein an opening is provided into which the film may be initially introduced to a closed position wherein it defines one side of a path through which the film may be fed, a member associated with the gate for guiding the film into such opening, means for feeding the film through the gate, a film-magazine containing both the delivery and take-up coils of the film and supporting the length of film therebetween, supports for said magazine so positioned upon said apparatus in relation to said guiding member that as the magazine is seated upon said supports the film extending between said coils engages with said guiding member and is directed thereby into such opening and into the gate, said magazine being readily mountable upon and removable from said supports, and resilient film-tensioning means having film guiding surfaces contacting with the film between said gate and at least one of said coils whereby that section of the film between said gate and said coil is guided during the feeding of the film through said gate while said gate is closed and whereby the tension of said section is controlled.

142. In a film handling apparatus, a film container adapted to contain both the delivery and take-up coils of a film and having a film delivery opening and a take-up opening between which openings the film extends, supports for said container upon said apparatus, said container being readily mountable upon said supports and removable therefrom, means for feeding the film from said delivery opening to said take-up opening, a gate having an opening for the insertion of the film, means for controlling the tension of the entire portion of the film which extends without said container, said tension control means being positioned between the gate and the container openings and having film contacting and guiding surfaces whereby said tension controlling means and said container guide said film into said gate as said container is positioned upon said supports.

143. In a film handling apparatus, a container for a film, which container embodies means for guiding said film, means for supporting said container upon said apparatus, film feeding means, an openable gate through which said film travels, means for controlling the tension of the entire portion of said film which extends without said container, and control means interconnecting said feeding means, said gate, and said tension control means for opening said gate, rendering said feeding means inoperative and rendering said tension control means inoperative.

144. In a film handling apparatus, a primary film-receiving spindle, a source of power for driving said spindle, a secondary film-receiving spindle, said spindles being so disposed that the same film may be simultaneously supported thereby, and driving mechanism connecting said spindles whereby said secondary spindle may be driven from said primary spindle, said mechanism including a motion transmitting member and readily removable attaching means for attaching said motion transmitting member to said primary spindle.

145. Apparatus comprising means for supporting a film, means for taking up said film, and means for moving said film from said supporting to said taking up means; and supplementary mechanism which can be readily attached to and detached from said apparatus, including means for supporting a film and means for taking up said film, said moving means of said apparatus being so positioned as to move said film from said supporting means of said mechanism to said taking up means of said mechanism, and a motion transmitting connection between said taking-up means of said apparatus and said taking-up means of said mechanism, whereby the taking-up means of said apparatus drives the taking-up means of said mechanism.

146. Apparatus comprising a spindle adapted to support a film thereon, a spindle adapted to take up said film, and means for moving said film from said supporting to said take-up spindle; and supplementary mechanism which can be readily attached to and detached from said apparatus including a spindle for supporting a film and a spindle for taking up said film, said moving means of said apparatus being so positioned as to move said film from said supporting spindle of said mechanism to said take up spindle of said mechanism, and a power-transmitting connection between the supporting spindle of said apparatus and the supporting spindle of said supplementary mechanism for controlling the rotation of said supporting spindle of said supplementary mechanism by the rotation of said supporting spindle of said apparatus.

147. Apparatus comprising a supply spindle adapted to support a film while the same is being unrolled for projection or exposure and to rewind said film after such projection or exposure, a spindle adapted to take up said film while the same is being projected or exposed and to support said film while the same is being rewound upon said previously mentioned spindle, means for moving said film from said supply spindle to said taking up spindle to project or expose the same, and means to apply power to said supply spindle to rewind said film thereon; and supplementary mechanism which can be readily attached to and detached from said apparatus including a supply spindle for supporting a film while the same is being unrolled for projection or exposure and to rewind the same after such projection or exposure, a spindle for taking up said film while said film is being projected or exposed and for supporting said film while said film is being rewound therefrom to said previously mentioned spindle of said mechanism, and means drivingly connecting said taking-up spindle of said apparatus and said taking-up spindle of said supplementary mechanism whereby said taking up spindle of said mechanism during the projection or exposure cycle is driven by said taking up spindle of said apparatus, and means drivingly connecting said supply spindle of said apparatus and said supply spindle of said supplementary mechanism whereby said supply spindle of said mechanism is driven by the supply spindle of said apparatus during the rewinding cycle, said moving means of said apparatus being adapted to move said film from said supply spindle of said mechanism during the feeding or projection cycle to said taking up spindle of said mechanism.

148. Apparatus and mechanism according to claim 147, including a connection between the supply spindle of said mechanism and the supply spindle of said apparatus for controlling the rotation of said supply spindle of said mechanism during said projection or exposure cycle by the rotation of said supply spindle of said apparatus.

149. In a film handling apparatus, two continuously operating film supporting members, mechanism for intermittently feeding a film from one of said members toward the other, means for rendering said feeding mechanism operative and inoperative upon the film for regularly advancing the film, mechanism for compensating for the difference in character of movement of said continuously operating film supporting members and said intermittent feeding mechanism, said compensating mechanism including members adapted to engage the film between each of said supporting members and said intermittent feeding mechanism and movable between a first position wherein they define one side of a relatively short path between said intermittent mechanism and each of said supporting members and a second position wherein they define one side of a relatively long path therebetween, means for moving said film engaging members between said positions, and sequential control means interlocking both of said means and effective for operating each of the same in predetermined succession.

150. In a film handling apparatus, a first and second continuously operating film supporting member between which a film extends, an apertured member disposed between said supporting members, said apertured member embodying two relatively fixed film guiding surfaces, a first of said surfaces extending toward said first film supporting member and a second of said surfaces extending toward said second film supporting member, a presser member disposed opposite the aperture of said apertured member and movable toward said apertured member for pressing the film thereagainst, means for intermittently advancing the film from said first support past the aperture and toward said second support, a first operable film engaging member, movable between a first position, wherein it is disposed in guiding relation to said first film guiding surface of said apertured member and wherein it forms one side of a relatively short path between said first film supporting member and said first guiding surface, and a second position, wherein it is removed from such guiding relation and forms one side of a relatively long path between said first guiding surface and said first supporting member, a second operable film engaging member, movable between a first position, wherein it is disposed in guiding relation to said second film guiding surface of said apertured member and wherein it forms one side of a relatively short path between said second film guiding surface and said second film supporting member, and a second position, wherein it is removed from such guiding relation and forms one side of a relatively long path between said second guiding surface and said second supporting member, and control means operatively interconnecting said presser member and said first and second film engaging members for operating said presser member and said film engaging members.

151. In a film handling apparatus, a first continuously moving support for a film, a second continuously moving support for the film, an openable gate disposed between said supports, means for intermittently feeding the film from said first support through said gate toward said second support, unitary guiding and tension-controlling mechanism for guiding the film during the preliminary positioning of the film in said apparatus and for creating the condition of tension in the film between said supports necessary for compensating for the difference in character of movement of said continuously moving supports and said intermittent feeding means during the regular feeding operation of said apparatus, said guiding and compensating mechanism including a first movable film engaging member, a substantially flat film guiding surface embodied therein, a mounting for said first member so disposed in relation to said first support and said gate that said first member is movable between a first position wherein said film guiding surface embodied therein directs the film in relation to one end of said gate and cooperates with said gate to form one side of a relatively short path between one end of said gate and said first support in which path the film is initially positioned while said gate is open and a second position wherein said film guiding surface forms one side of a relatively long path through which the film is fed while said gate is closed, a second movable film engaging member, a substantially flat film guiding surface embodied therein, a mounting for said second member so disposed in relation to said second support and said gate that said second member is movable between a first position wherein said film guiding surface embodied therein directs the film in relation to the other end of said gate and cooperates with said gate to form one side of a relatively short path between the other end of said gate and said second support in which path the film is initially positioned while said gate is open and a second position wherein said film guiding surface forms one side of a relatively long path through which the film is fed while said gate is closed, means for opening and closing said gate, and unitary control means interconnecting said first and second members for moving them between said first and second positions.

152. Apparatus according to claim 151, said apparatus including means for latching said first and second film engaging members in said first and second positions.

153. In a film handling apparatus, an idling delivery carrier, a continuously driven take-up carrier, a gate structure disposed therebetween, said gate structure comprising complementary members defining therebetween a path for a film, means for intermittently feeding the film from said delivery carrier through said path toward said take-up carrier, said feeding means extending within said path for feeding the film therealong, means for initially increasing the length of that portion of the film extending between said carriers whereby a sufficient amount of film is provided to allow for the compensation necessary because of the difference of the character of movement of said carriers and said intermittent feeding means during the operation of the same, and operable means for preventing said feeding means from operatively engaging the film.

154. In a film handling apparatus, a film container adapted to contain both the delivery and take-up coils of a film, supports for said container upon said apparatus, means by which said container is readily mountable upon said supports and removable therefrom, means for feeding the film from said delivery coil to said take-up coil, an apertured member disposed between said coils while said container is positioned upon said supports past which the film is fed, means for controlling the tension of the entire portion of the film which extends between said coils, said tension controlling means being positioned between said apertured member and said coils and having film contacting and guiding surfaces whereby said tension controlling means and said container guide said film in relation to the aperture of said member when said container is positioned upon said supports.

In testimony whereof I have hereunto set my hand.

BARTON A. PROCTOR.